(12) United States Patent　　(10) Patent No.:　US 12,672,651 B2

Tomita et al.　　(45) Date of Patent:　　Jul. 7, 2026

(54) EVAPORATION INHIBITOR FOR PLANT TREATMENT AGENTS

(71) Applicant: KAO CORPORATION, Tokyo (JP)

(72) Inventors: Hiroshi Tomita, Wakayama (JP); Takahito Ui, Wakayama (JP); Shota Yamamoto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 826 days.

(21) Appl. No.: 17/912,554

(22) PCT Filed: Apr. 9, 2021

(86) PCT No.: PCT/JP2021/015026

§ 371 (c)(1),
(2) Date: Sep. 19, 2022

(87) PCT Pub. No.: WO2021/206165

PCT Pub. Date: Oct. 14, 2021

(65) Prior Publication Data

US 2023/0136012 A1　　May 4, 2023

(30) Foreign Application Priority Data

Apr. 10, 2020　(JP) ................................. 2020-071022

(51) Int. Cl.
　*A01N 25/04*　　　(2006.01)
　*A01N 37/24*　　　(2006.01)
　　　　(Continued)

(52) U.S. Cl.
　CPC ............. *A01N 25/04* (2013.01); *A01N 37/24* (2013.01); *A01N 43/12* (2013.01); *A01N 43/54* (2013.01);
　　　　(Continued)

(58) Field of Classification Search
　CPC ........ A01N 25/04; A01N 37/24; A01N 43/12; A01N 43/54; A01N 43/56; A01N 47/34; A01N 47/44; A01P 1/00
　See application file for complete search history.

(56) References Cited

U.S. PATENT DOCUMENTS

| | | |
|---|---|---|
| 3,873,689 A | 3/1975 | Frensch et al. |
| 4,932,994 A | 6/1990 | Koester et al. |
| | (Continued) | |

FOREIGN PATENT DOCUMENTS

| | | |
|---|---|---|
| AU | 2019219812 B1 | 9/2019 |
| CN | 102675010 A | 9/2012 |
| | (Continued) | |

OTHER PUBLICATIONS

Hall, Franklin R, et al., "Measurement of Evaporation from Adjuvant Solutions Using a Volumetric Method", Pesticide Science, 1994, vol. 40, No. 1, p. 17-24.

(Continued)

*Primary Examiner* — Trevor Love
(74) *Attorney, Agent, or Firm* — Element IP, PLC

(57)　　　　ABSTRACT

The present invention is an evaporation inhibitor for plant treatment agents composed of at least one compound selected from (A1) a compound obtained by adding a predetermined amount of at least one alkylene oxide (hereinafter referred to as AO) selected from ethylene oxide (hereinafter referred to as EO) and propylene oxide (hereinafter referred to as PO) to a predetermined alcohol, (A2) a compound obtained by adding a predetermined amount of at least one AO selected from EO and PO to a predetermined carboxylic acid, (A3) a compound obtained by adding a predetermined amount of at least one AO selected from EO and PO to a monoester of a fatty acid with 10 or more and 20 or less carbons and sorbitan, (A4) a polyalkylene glycol with a weight average molecular weight of 100 or more and (Continued)

3000 or less, (A5) a predetermined ester compound, and (A6) a predetermined carboxylic acid.

7 Claims, 1 Drawing Sheet

(51) Int. Cl.

| | |
|---|---|
| *A01N 43/12* | (2006.01) |
| *A01N 43/54* | (2006.01) |
| *A01N 43/56* | (2006.01) |
| *A01N 47/34* | (2006.01) |
| *A01N 47/44* | (2006.01) |
| *A01P 1/00* | (2006.01) |

(52) U.S. Cl.
CPC ............. *A01N 43/56* (2013.01); *A01N 47/34* (2013.01); *A01N 47/44* (2013.01); *A01P 1/00* (2021.08)

(56) References Cited

U.S. PATENT DOCUMENTS

| | | | |
|---|---|---|---|
| 5,466,458 | A | 11/1995 | Martin et al. |
| 5,863,909 | A | 1/1999 | Kurita et al. |
| 2005/0084471 | A1 | 4/2005 | Andrews et al. |
| 2007/0190096 | A1 | 8/2007 | Arimoto |
| 2013/0039871 | A1 | 2/2013 | Murata |
| 2013/0196854 | A1 | 8/2013 | Kamei et al. |
| 2016/0015615 | A1 | 1/2016 | Mann et al. |
| 2017/0105410 | A1 | 4/2017 | Kamei et al. |
| 2017/0295782 | A1 | 10/2017 | Klostermann et al. |

FOREIGN PATENT DOCUMENTS

| | | | |
|---|---|---|---|
| CN | 103299993 | A | 9/2013 |
| CN | 106916013 | A | 7/2017 |
| CN | 107047548 | A | 8/2017 |
| CN | 107646840 | A | 2/2018 |
| CN | 108293985 | A | 7/2018 |
| CN | 108294043 | A | 7/2018 |
| CN | 108902203 | A | 11/2018 |
| CN | 109452268 | A | 3/2019 |
| CN | 109601531 | A | 4/2019 |
| CN | 109757493 | A | 5/2019 |
| CN | 110461153 | A | 11/2019 |
| CN | 110583637 | A | 12/2019 |
| GB | 1293853 | A | 10/1972 |
| JP | S61-122202 | A | 6/1986 |
| JP | H08-151302 | A | 6/1996 |
| JP | 2000319643 | A | 11/2000 |
| JP | 2012184187 | A | 9/2012 |
| JP | 2013170146 | A | 9/2013 |
| JP | 2014125445 | A | 7/2014 |
| JP | 2015163604 | A | 9/2015 |
| KR | 20090114745 | A | 11/2009 |
| WO | WO-2012029893 | A1 | 3/2012 |
| WO | WO-2013075977 | A1 | 5/2013 |
| WO | WO-2018173184 | A1 | 9/2018 |

OTHER PUBLICATIONS

International Search Report issued Jun. 29, 2021 in PCT/JP2021/015026 (with English translation), 7 pages.

English translation of the International Preliminary Report on Patentability and Written Opinion mailed Oct. 20, 2022 in PCT/JP2021/015026, 9 pages.

Extended European Search Report issued Jul. 15, 2024 in corresponding European Patent Application No. 21783930.7, 26 pages.

Partial Supplementary European Search Report issued Mar. 22, 2024 in corresponding European Patent Application No. 21783930.7, 19 pages.

[FIG. 1]
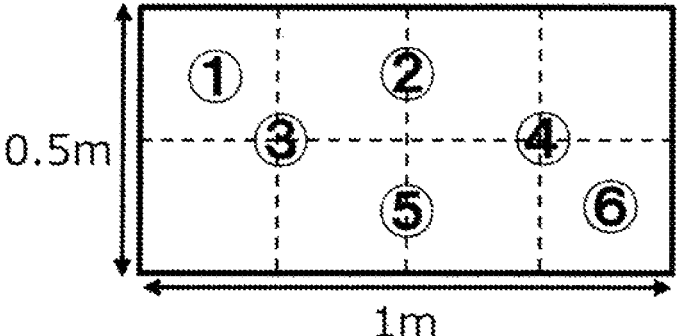
[FIG. 2]
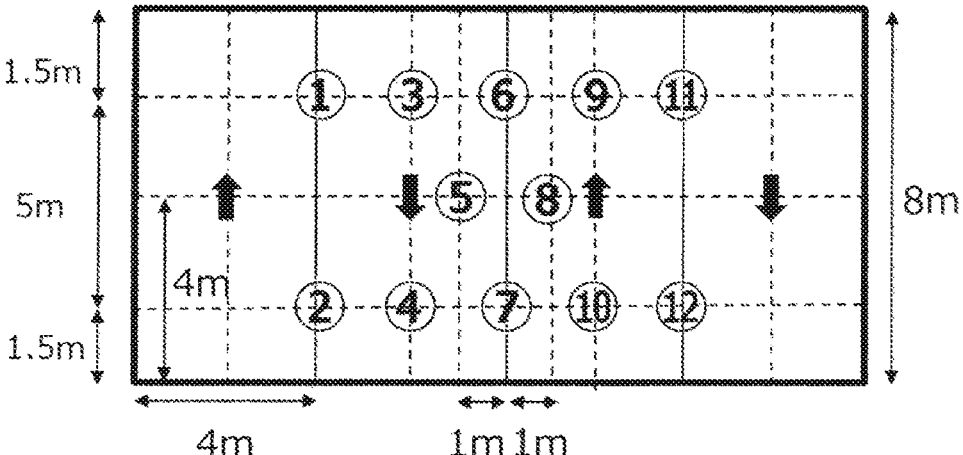

EVAPORATION INHIBITOR FOR PLANT TREATMENT AGENTS

FIELD OF THE INVENTION

The present invention relates to an evaporation inhibitor for plant treatment agents, an evaporation inhibitor composition for plant treatment agents, an agrochemical efficacy enhancing agent composition, a plant treatment agent composition and a method for treating a plant.

BACKGROUND OF THE INVENTION

In recent years, problems that affect food supply have been increasing, such as a shrinking and aging agricultural workforce or an increase in natural disasters under the influence of climate change. In particular, improving the productivity of reliable and safe food is an important issue. Against such a background, agrochemical spraying technologies utilizing industrial multirotors (drones) have been developed for the purposes of mechanizing and automating food production, especially crop production, and reducing the use amount of agrochemicals. Drone spraying is characterized by the advantages of shortening work time, reducing work, improving spray accuracy, thereby reducing the use amount of agrochemicals and reducing the use amount of water, and enabling work after sunset, but also has the following problems: agrochemicals, which are sprayed with a low amount of water from a high spray altitude, fall a long distance before reaching crops or the like, so that the droplets evaporate during falling to significantly reduce the coverage performance of the agrochemicals, and drift that agrochemicals are carried by the wind is likely to occur. Further, the development of drone spraying technologies is expected from the viewpoints of being effective at attempting to solve the problem of a declining and aging agricultural workforce as in Japan, as well as enabling the application with a low amount of water also in the expansion of arable area in arid regions suffering severe food insecurity.

Agrochemicals are used for the purposes of increasing the production of useful plants such as crops or the like and protecting them, eradicating harmful plants such as weeds or the like and harmful insects, or the like. Agrochemical efficacy enhancing agent compositions have been conventionally developed to fully exploit the effects of agrochemicals. For example, JP-A 2012-184187 discloses an efficacy-enhancing agent composition for an agricultural chemical comprising, at least one compound (A) selected from specific ethoxylate compounds, specific polyoxyethylene fatty acid esters, specific polyoxyethylene sorbitan fatty acid esters, specific (poly)glycerol fatty acid esters and specific alkyl saccharides, and at least one compound (B) selected from alcohols having a linear or branched alkyl group having 8 to 14 carbon atoms. WO-A 2018/173184 discloses an agrochemical efficacy enhancing agent composition comprising, (A) a specific polyoxyethylene fatty acid ester, (B) a specific aliphatic alcohol and (C) a specific fatty acid.

On the other hand, when agrochemicals are applied in minute droplet form by aerial spraying or the like, the droplets desirably contain a high concentration of agrochemicals and have a small particle size. However, such minute droplets do not produce designed agrochemical effects as water in the droplets is easy to evaporate, and there are also concerns about the scattering to the surrounding environment as further miniaturization makes them easier to fly in all directions. Therefore, the ability to inhibit the evaporation of water in the droplets as much as possible is desired. JP-A S61-122202 discloses an evaporation inhibitor for spray mixtures containing agricultural chemicals applied by the Low-Volume method in the form of a wax-containing aqueous dispersion or self-emulsifying solution in an organic solvent, wherein the evaporation inhibitor comprises from 15 to 50% by weight of a wax or a wax mixture, from 4 to 20% by weight of non-ionic and/or anionic emulsifier, from 19.5 to 81% by weight of water and/or an organic solvent selected from the group of hydrocarbons, esters and ketones having boiling points of from 70 to 280° C., from 0 to 5.5% by weight of other auxiliaries, and from 0 to 5.0% by weight of an amine or an alkali.

SUMMARY OF THE INVENTION

Efficient application of plant treatment agents such as agrochemicals or the like leads to improved productivity of plants such as crops or the like. As one of the measures for that, a technology for enabling efficient spraying of plant treatment agents such as agrochemicals or the like at a high concentration and with a low amount of water from aircrafts such as drones or the like is demanded.

The present invention provides an evaporation inhibitor for plant treatment agents that can efficiently enhance the efficacy of plant treatment agents such as agrochemicals or the like, and further can improve the coverage performance of plant treatment agents such as agrochemicals or the like when the plant treatment agents such as agrochemicals or the like are applied at a high concentration and with a low amount of water, for example, sprayed by drones.

The present invention relates to an evaporation inhibitor for plant treatment agents composed of (A) at least one compound selected from the following compounds (A1) to (A6) [hereinafter referred to as component (A)]:

<Compound (A1)> a compound obtained by adding at least one alkylene oxide (hereinafter referred to as AO) selected from ethylene oxide (hereinafter referred to as EO) and propylene oxide (hereinafter referred to as PO) at an average number of added moles of 1 or more and 22 or less to a compound of the following formula (I):

$$R^1OH \tag{I}$$

wherein in the formula (I), $R^1$ is an alkyl group with 10 or more and 14 or less carbons or an alkenyl group with 10 or more and 14 or less carbons;

<Compound (A2)> a compound obtained by adding at least one AO selected from EO and PO at an average number of added moles of 1 or more and 22 or less to a compound of the following formula (II):

$$R^2—COOH \tag{II}$$

wherein in the formula (II), $R^2$ is an alkyl group with 11 or more and 19 or less carbons or an alkenyl group with 11 or more and 19 or less carbons;

<Compound (A3)> a compound obtained by adding at least one AO selected from EO and PO at an average number of added moles of 1 or more and 22 or less to a monoester of a fatty acid with 10 or more and 20 or less carbons and sorbitan;

<Compound (A4)> a polyalkylene glycol with a weight average molecular weight of 100 or more and 3000 or less;

<Compound (A5)> a compound represented by the following formula (III):

$$R^3—COO—R^4 \tag{III}$$

wherein in the formula (III), $R^3$ is an alkyl group with 15 or more and 19 or less carbons, and $R^4$ is an alkyl group with 1 or more and 18 or less carbons; and <Compound (A6)> a compound represented by the following formula (IV):

$$R^5\text{—COOH} \qquad\qquad\qquad\qquad (IV)$$

wherein in the formula (IV), $R^5$ is an alkyl group with 7 or more and 19 or less carbons or an alkenyl group with 7 or more and 19 or less carbons.

Further, the present invention relates to an evaporation inhibitor composition for plant treatment agents containing, the evaporation inhibitor for plant treatment agents of the present invention.

Further, the present invention relates to an agrochemical efficacy enhancing agent composition containing, the evaporation inhibitor for plant treatment agents of the present invention and (B) an agrochemical efficacy enhancing agent other than component (A).

Further, the present invention relates to a plant treatment agent composition containing, the evaporation inhibitor for plant treatment agents of the present invention and a plant treatment agent.

Further, the present invention relates to a method for treating a plant including, a step of applying a treatment liquid that contains the evaporation inhibitor for plant treatment agents of the present invention and a plant treatment agent to the plant.

According to the present invention, provided are an evaporation inhibitor for plant treatment agents that can efficiently enhance the efficacy of plant treatment agents such as agrochemicals or the like, and further can improve the coverage performance of plant treatment agents such as agrochemicals or the like when the plant treatment agents such as agrochemicals or the like are applied at a high concentration and with a low amount of water, for example, sprayed by drones, an agrochemical efficacy enhancing agent composition and a plant treatment agent composition containing the same, and a method for treating a plant.

The evaporation inhibitor for plant treatment agents, and the agrochemical efficacy enhancing agent composition and the plant treatment agent composition formulated with the same of the present invention can be safely used without agrochemical damage to various kinds of plants.

BRIEF DESCRIPTION OF DRAWINGS

FIG. 1 is a schematic view indicating the positions at which an agrochemical composition is sprayed in example 1 or the like.

FIG. 2 is a schematic view indicating the positions at which an agrochemical composition is sprayed in example 7.

EMBODIMENTS OF THE INVENTION

The evaporation inhibitor for plant treatment agents of the present invention can inhibit the evaporation of water during spraying, and thus can efficiently enhance the efficacy of plant treatment agents such as agrochemicals or the like, and can exhibit excellent ability to improve the coverage performance of plant treatment agents such as agrochemicals or the like especially in high-concentration and low-water amount spraying using drones.

The details of the working mechanism of the evaporation inhibitor for plant treatment agents of the present invention are not clear, but considered as follows.

When chemical agents to be applied to plants, such as agrochemicals or the like, are sprayed to target plants, they are generally applied with sprayers such as atomizers, sprays or the like using water as a solvent and a dispersion medium. For example, in the case of agrochemicals, the use amount thereof is suppressed to as minimum as possible in consideration of environmental impact, and they may be formulated with a spreadability improvement component or the like for efficient adhesion to parts on which the agrochemical effects should be exhibited. For example, in order to make agrochemicals adhere to the entire surface of leaves, a method of directly bringing agrochemicals into adhesion to the entire surface of leaves, a method of making agrochemicals spread wetly after adhesion, in other words, spreading them out, to cover the entire surface, or the like is adopted. Directly bringing them into adhesion to the entire surface requires a large amount of spray, and is wasteful and unsuitable for the above purpose. In the case of spreading them out, a spreading component highly wettable and spreadable may be used, but a solvent and a dispersion medium such as water or the like are evaporated before agrochemicals adhere to leaves after sprayed, and by the time they adhere to leaves, they are concentrated and highly viscous, and are difficult to spread wetly. In particular, the fall distance, the influence of wind and the size of droplets (the surface area of droplets) lead to an increase in drift time after spraying, and thus become factors for the evaporation of a solvent and a dispersion medium such as water or the like. It is inferred that containing the evaporation inhibitor for plant treatment agents of the present invention can inhibit the evaporation of a solvent and a dispersion medium after spraying, and thus can maintain high wetting and spreading performance after adhesion to leaves. Further, from the fact that the evaporation inhibitor for plant treatment agents of the present invention develops its effects in an amount much smaller than the content required for enabling the coverage of the entire surface of droplets, it is inferred that the effects are not developed due to the coverage of the surface of droplets, but due to the formation of a structure that is difficult to evaporate, such as the formation of a composite product with other components such as agrochemicals or the like, although the details are unknown. Further, it is inferred that, as such effects are obtained, the evaporation inhibitor for plant treatment agents of the present invention exhibits its effects more in spraying of a high concentration of an agrochemical in a low spray amount from a high spray altitude using a drone generating its own wind.

[Evaporation Inhibitor for Plant Treatment Agents]

The evaporation inhibitor for plant treatment agents of the present invention is composed of component (A), which is at least one compound selected from compounds (A1) to (A6) listed below. The evaporation inhibitor for plant treatment agents of the present invention may be composed of one or two or more of compounds (A1) to (A6). Component (A) is preferably at least one compound selected from compounds (A2), (A3), (A4) and (A6), more preferably at least one compound selected from compounds (A3), (A4) and (A6), and further preferably any one compound of compounds (A3) and (A6).

<Compound (A1)>

A compound obtained by adding at least one AO selected from EO and PO at an average number of added moles of 1 or more and 22 or less to a compound of the following formula (I):

5

6

$$R^1OH \qquad (I)$$

wherein in the formula (I), $R^1$ is an alkyl group with 10 or more and 14 or less carbons or an alkenyl group with 10 or more and 14 or less carbons.

<Compound (A2)>

A compound obtained by adding at least one AO selected from EO and PO at an average number of added moles of 1 or more and 22 or less to a compound of the following formula (II):

$$R^2—COOH \qquad (II)$$

wherein in the formula (II), $R^2$ is an alkyl group with 11 or more and 19 or less carbons or an alkenyl group with 11 or more and 19 or less carbons.

<Compound (A3)>

A compound obtained by adding at least one AO selected from EO and PO at an average number of added moles of 1 or more and 22 or less to a monoester of a fatty acid with 10 or more and 20 or less carbons and sorbitan.

<Compound (A4)>

A polyalkylene glycol with a weight average molecular weight of 100 or more and 3000 or less.

<Compound (A5)>

A compound represented by the following formula (III):

$$R^3—COO—R^4 \qquad (III)$$

wherein in the formula (III), $R^3$ is an alkyl group with 15 or more and 19 or less carbons, and $R^4$ is an alkyl group with 1 or more and 18 or less carbons.

<Compound (A6)>

A compound represented by the following formula (IV):

$$R^5—COOH \qquad (IV)$$

wherein in the formula (IV), $R^5$ is an alkyl group with 7 or more and 19 or less carbons or an alkenyl group with 7 or more and 19 or less carbons.

[Compound (A1)]

Compound (A1) of the present invention is a compound obtained by adding at least one AO selected from EO and PO at an average number of added moles of 1 or more and 22 or less to a compound of the following formula (I):

$$R^1OH \qquad (I)$$

wherein in the formula (I), $R^1$ is an alkyl group with 10 or more and 14 or less carbons or an alkenyl group with 10 or more and 14 or less carbons.

AO is at least one selected from EO and PO and may be any one or a combination of the two, and in the case of a combination of the two, they may be in blocks or at random. AO is preferably EO from the viewpoint of improving the coverage rate of a plant treatment agent such as an agrochemical or the like (hereinafter also referred to as the coverage rate). The average number of added moles of AO is 1 or more, preferably 2 or more, more preferably 3 or more, further preferably 4 or more and furthermore preferably 5 or more from the viewpoint of improving the coverage rate, and 22 or less, preferably 20 or less, more preferably 18 or less and further preferably 15 or less from the same viewpoint.

In the formula (I), $R^1$ is an alkyl group with 10 or more and 14 or less carbons or an alkenyl group with 10 or more and 14 or less carbons. $R^1$ has 10 or more and preferably 11 or more, and 14 or less, preferably 13 or less and more preferably 12 carbons from the viewpoint of improving the coverage rate. $R^1$ may be a straight chain or a branched chain. $R^1$ is preferably a straight chain or branched chain alkyl group and more preferably a straight chain alkyl group from the viewpoint of improving the coverage rate.

Specific examples of the compound of the formula (I) include n-decanol, isodecanol, 2-propylheptanol, 4-methyl-2-propylhexanol, n-dodecanol, sec-dodecanol, tridecanol, n-tetradecanol, sec-tetradecanol or the like, and n-dodecanol, sec-dodecanol and tridecanol are preferable and n-dodecanol is more preferable from the viewpoint of improving the coverage rate.

Specific examples of compound (A1) include a polyoxyethylene (1 or more and 22 or less) decyl ether, a polyoxyethylene (1 or more and 22 or less) dodecyl ether, a polyoxyethylene (1 or more and 22 or less) tridecyl ether, a polyoxyethylene (1 or more and 22 or less) tetradecyl ether or the like and the compounds obtained by replacing oxyethylene of theirs in whole or part with oxypropylene, and a polyoxyethylene (1 or more and 22 or less) dodecyl ether is preferable, a polyoxyethylene (5 or more and 12 or less) dodecyl ether is more preferable, and polyoxyethylene (6) dodecyl ether is further preferable from the viewpoint of improving the coverage rate. Here, the numbers in parentheses represent the average number of added moles of AO (the same applies to compounds (A2) and (A3)).

[Compound (A2)]

Compound (A2) of the present invention is a compound obtained by adding at least one AO selected from EO and PO at an average number of added moles of 1 or more and 22 or less to a compound of the following formula (II):

$$R^2—COOH \qquad (II)$$

wherein in the formula (II), $R^2$ is an alkyl group with 11 or more and 19 or less carbons or an alkenyl group with 11 or more and 19 or less carbons.

The preferable aspects and the preferable average number of added moles of AO in compound (A2) are the same as those in compound (A1).

In the formula (II), $R^2$ is an alkyl group with 11 or more and 19 or less carbons or an alkenyl group with 11 or more and 19 or less carbons. $R^2$ has 11 or more, preferably 13 or more and more preferably 15 or more, and 19 or less, preferably 18 or less and more preferably 17 or less carbons from the viewpoint of improving the coverage rate. $R^2$ may be a straight chain or a branched chain. $R^2$ is preferably a straight chain alkyl group or a straight chain alkenyl group and more preferably a straight chain alkenyl group from the viewpoint of improving the coverage rate.

Specific examples of the compound of the formula (II) include saturated fatty acids such as dodecanoic acid, tetradecanoic acid, hexadecanoic acid, octadecanoic acid, eicosanoic acid or the like, unsaturated fatty acids such as dodecenoic acid, tetradecenoic acid, hexadecenoic acid, oleic acid, linoleic acid, linolenic acid or the like, and others, and dodecanoic acid, tetradecanoic acid, oleic acid, linoleic acid and linolenic acid are preferable and oleic acid is more preferable from the viewpoint of improving the coverage rate.

Specific examples of compound (A2) include a polyoxyethylene (1 or more and 22 or less) laurate, a polyoxyethylene (1 or more and 22 or less) myristate, a polyoxyethylene (1 or more and 22 or less) palmitate, a polyoxyethylene (1 or more and 22 or less) stearate, a polyoxyethylene (1 or more and 22 or less) oleate or the like and the compounds obtained by replacing oxyethylene of theirs in whole or part with oxypropylene, and a polyoxyethylene (1 or more and 22 or less) oleate is preferable, a polyoxyethylene (5 or more and 12 or less) oleate is more preferable, and polyoxyethylene (10) oleate is further preferable from the viewpoint of improving the coverage rate.

[Compound (A3)]

Compound (A3) is a compound obtained by adding at least one AO selected from EO and PO at an average number of added moles of 1 or more and 22 or less to a monoester of a fatty acid with 10 or more and 20 or less carbons and sorbitan.

The preferable aspects and the preferable average number of added moles of AO in compound (A3) are the same as those in compound (A1).

The fatty acid of one of the constituents of compound (A3) has 10 or more, preferably 11 or more and more preferably 12 or more, and 20 or less, preferably 18 or less and more preferably 16 or less carbons from the viewpoint of improving the coverage rate. The fatty acid may be saturated or unsaturated, and a straight chain saturated fatty acid or unsaturated fatty acid is preferable and a straight chain saturated fatty acid is more preferable from the viewpoint of improving the coverage rate. Specific examples of the fatty acid include saturated fatty acids such as decanoic acid, dodecanoic acid, tetradecanoic acid, hexadecanoic acid, octadecanoic acid, eicosanoic acid or the like, unsaturated fatty acids such as dodecenoic acid, tetradecenoic acid, hexadecenoic acid, oleic acid, linoleic acid, linolenic acid or the like, and others, and dodecanoic acid, tetradecanoic acid and oleic acid are preferable and dodecanoic acid is more preferable from the viewpoint of improving the coverage rate.

Specific examples of the monoester of a fatty acid and sorbitan include sorbitan monolaurate, sorbitan monomyristate, sorbitan monopalmitate, sorbitan monostearate and sorbitan monooleate, and sorbitan monolaurate, sorbitan monomyristate and sorbitan monooleate are preferable and sorbitan monolaurate is more preferable from the viewpoint of improving the coverage rate.

Specific examples of compound (A3) include a polyoxyethylene (1 or more and 22 or less) sorbitan monolaurate, a polyoxyethylene (1 or more and 22 or less) sorbitan monomyristate, a polyoxyethylene (1 or more and 22 or less) sorbitan monopalmitate, a polyoxyethylene (1 or more and 22 or less) sorbitan monostearate, a polyoxyethylene (1 or more and 22 or less) sorbitan monooleate or the like and the compounds obtained by replacing oxyethylene of theirs in whole or part with oxypropylene, and a polyoxyethylene (1 or more and 22 or less) sorbitan monolaurate is preferable, a polyoxyethylene (5 or more and 12 or less) sorbitan monolaurate is more preferable, and polyoxyethylene (6)

sorbitan monolaurate is further preferable from the viewpoint of improving the coverage rate.

[Compound (A4)]

Compound (A4) is a polyalkylene glycol with a weight average molecular weight of 100 or more and 3000 or less. The weight average molecular weight of compound (A4) is 100 or more, preferably 150 or more and more preferably 200 or more, and 3000 or less, preferably 2500 or less and more preferably 2000 or less from the viewpoint of improving the coverage rate. This weight average molecular weight is measured by a gel permeation chromatography (GPC) method.

Examples of compound (A4) include the following compounds (A4-1) and (A4-2):

<Compound (A4-1)> a polyethylene glycol with a weight average molecular weight of 100 or more and 3000 or less; and <Compound (A4-2)> a polypropylene glycol with a weight average molecular weight of 800 or more and 3000 or less.

Compound (A4-1) is a polyethylene glycol with a weight average molecular weight of 100 or more and 3000 or less. The weight average molecular weight of compound (A4-1) is 100 or more, preferably 150 or more and more preferably 200 or more, and 3000 or less, preferably 2500 or less and more preferably 2000 or less from the viewpoint of improving the coverage rate. This weight average molecular weight is measured by a gel permeation chromatography (GPC) method.

Compound (A4-2) is a polypropylene glycol with a weight average molecular weight of 800 or more and 3000 or less. The weight average molecular weight of compound (A4-2) is 800 or more, preferably 1000 or more and more preferably 1500 or more, and 3000 or less, preferably 2500 or less and more preferably 2000 or less from the viewpoint of improving the coverage rate. This weight average molecular weight is measured by a gel permeation chromatography (GPC) method.

[Compound (A5)]

Compound (A5) of the present invention is a compound represented by the following formula (III):

$$R^3 - COO - R^4 \tag{III}$$

wherein in the formula (III), $R^3$ is an alkyl group with 15 or more and 19 or less carbons, and $R^4$ is an alkyl group with 1 or more and 18 or less carbons.

In the formula (III), $R^3$ is an alkyl group with 15 or more and 19 or less carbons. $R^3$ has 15 or more and preferably 16 or more, and 19 or less, preferably 18 or less and more preferably 17 carbons from the viewpoint of improving the coverage rate. $R^3$ may be a straight chain or a branched chain. $R^3$ is preferably a straight chain alkyl group from the viewpoint of improving the coverage rate.

In the formula (III), $R^4$ is an alkyl group with 1 or more and 18 or less carbons. $R^4$ has 1 or more, preferably 5 or more and more preferably 10 or more, and 18 or less, preferably 16 or less and more preferably 14 or less carbons from the viewpoint of improving the coverage rate. $R^4$ may be a straight chain or a branched chain. $R^4$ is preferably a branched chain alkyl group from the viewpoint of improving the coverage rate.

Specific examples of compound (A5) include methyl palmitate, methyl stearate, ethyl palmitate, ethyl stearate, isopropyl palmitate, isopropyl stearate, n-butyl palmitate, n-butyl stearate, isobutyl palmitate, isobutyl stearate, t-butyl palmitate, t-butyl stearate, n-octyl palmitate, n-octyl stearate, 2-ethylhexyl palmitate, 2-ethylhexyl stearate, decyl palmitate, decyl stearate, dodecyl palmitate, dodecyl stearate, isotridecyl palmitate, isotridecyl stearate, hexadecyl palmitate, hexadecyl stearate, 2-hexyldecyl palmitate, 2-hexyldecyl stearate, stearyl stearate or the like, and from the viewpoint of improving the coverage rate, preferable are isopropyl palmitate, isopropyl stearate, isobutyl palmitate, isobutyl stearate, t-butyl palmitate, t-butyl stearate, 2-ethylhexyl palmitate, 2-ethylhexyl stearate, decyl palmitate, decyl stearate, dodecyl palmitate, dodecyl stearate, isotridecyl palmitate, isotridecyl stearate, hexadecyl palmitate, hexadecyl stearate, 2-hexyldecyl palmitate and 2-hexyldecyl stearate, more preferable are 2-ethylhexyl palmitate, 2-ethylhexyl stearate, decyl palmitate, decyl stearate, dodecyl palmitate, dodecyl stearate, isotridecyl palmitate, isotridecyl stearate, 2-hexyldecyl palmitate and 2-hexyldecyl stearate, further preferable are dodecyl stearate, isotridecyl stearate and 2-hexyldecyl stearate, and furthermore preferable is isotridecyl stearate.

[Compound (A6)]

Compound (A6) of the present invention is a compound represented by the following formula (IV):

$$R^5\text{---}COOH \tag{IV}$$

wherein in the formula (IV), $R^5$ is an alkyl group with 7 or more and 19 or less carbons or an alkenyl group with 7 or more and 19 or less carbons.

In the formula (IV), $R^5$ is an alkyl group with 7 or more and 19 or less carbons or an alkenyl group with 7 or more and 19 or less carbons. $R^5$ has 7 or more, preferably 8 or more and more preferably 9 or more, and 19 or less, preferably 17 or less and more preferably 15 or less carbons from the viewpoint of improving the coverage rate. $R^5$ may be a straight chain or a branched chain. $R^5$ is preferably a straight chain or branched chain alkyl group and more preferably a straight chain alkyl group from the viewpoint of improving the coverage rate.

Specific examples of compound (A6) include caprylic acid, capric acid, lauric acid, myristic acid, palmitic acid, stearic acid, oleic acid or the like, and capric acid and oleic acid are preferable and capric acid is more preferable from the viewpoint of improving the coverage rate.

The evaporation inhibitor for plant treatment agents of the present invention may be composed of at least one compound selected from compounds (A1), (A2), (A3), (A4-1), (A4-2), (A5) and (A6). Component (A) is preferably at least one compound selected from compounds (A2), (A3), (A4-1), (A4-2) and (A6), more preferably at least one compound selected from compounds (A3), (A4-1) and (A6), and further preferably any one compound of compounds (A3) and (A6).

The evaporation inhibitor for plant treatment agents of the present invention includes the evaporation inhibitor for plant treatment agents, in which component (A) is compound (A1), in other words, composed of compound (A1).

The evaporation inhibitor for plant treatment agents of the present invention includes the evaporation inhibitor for plant treatment agents, in which component (A) is compound (A2), in other words, composed of compound (A2).

The evaporation inhibitor for plant treatment agents of the present invention includes the evaporation inhibitor for plant treatment agents, in which component (A) is compound (A3), in other words, composed of compound (A3).

The evaporation inhibitor for plant treatment agents of the present invention includes the evaporation inhibitor for plant treatment agents, in which component (A) is compound (A4), in other words, composed of compound (A4).

The evaporation inhibitor for plant treatment agents of the present invention includes the evaporation inhibitor for plant treatment agents, in which component (A) is compound (A5), in other words, composed of compound (A5).

The evaporation inhibitor for plant treatment agents of the present invention includes the evaporation inhibitor for plant treatment agents, in which component (A) is compound (A6), in other words, composed of compound (A6).

The evaporation inhibitor for plant treatment agents of the present invention is preferably formulated into a treatment liquid to be applied to a plant and used. The concentration of component (A) during use of the evaporation inhibitor for plant treatment agents of the present invention is preferably 30 mg/kg or more, more preferably 50 mg/kg or more, further preferably 70 mg/kg or more and furthermore preferably 100 mg/kg or more, and preferably 6000 mg/kg or less, more preferably 3000 mg/kg or less, further preferably 2000 mg/kg or less, furthermore preferably 1000 mg/kg or less, furthermore preferably 500 mg/kg or less and furthermore preferably 300 mg/kg or less with respect to the treatment liquid to be applied to a plant.

[Evaporation Inhibitor Composition for Plant Treatment Agents]

The present invention provides an evaporation inhibitor composition for plant treatment agents containing, the evaporation inhibitor for plant treatment agents of the present invention. In other words, the present invention provides an evaporation inhibitor composition for plant treatment agents containing component (A). The evaporation inhibitor composition for plant treatment agents of the present invention contains component (A) as an active component for inhibiting the evaporation of a plant treatment agent such as an agrochemical or the like.

The matters stated in the evaporation inhibitor for plant treatment agents of the present invention can be appropriately applied to the evaporation inhibitor composition for plant treatment agents of the present invention. The specific examples, preferable aspects or the like of component (A) are also the same as those in the evaporation inhibitor for plant treatment agents of the present invention.

The evaporation inhibitor composition for plant treatment agents of the present invention can contain components other than component (A). Examples of the components other than component (A) include water or organic solvents such as ethanol, ethyl lactate, dimethyl sulfoxide and the like as a solvent or a dispersion medium, a chelating agent, a pH adjuster, an inorganic salt, a thickener, a defoamer or the like. Further, the evaporation inhibitor composition for plant treatment agents of the present invention can contain components (B) and (C) described later.

The evaporation inhibitor composition for plant treatment agents of the present invention can contain water as a solvent or a dispersion medium. When the evaporation inhibitor composition for plant treatment agents of the present invention contains water, component (A) and the optional components are easily dispersed and dissolved in a dilution medium (for example, water and/or an organic solvent) during the dilution of the composition, so that, when the composition is applied together with a plant treatment agent such as an agrochemical or the like, a step of carrying out dilution with a dilution medium to prepare a treatment liquid becomes easy.

During use of the evaporation inhibitor composition for plant treatment agents of the present invention, in other words, when the composition is applied to a plant together with a plant treatment agent such as an agrochemical or the like, the concentration of component (A) is preferably 30 mg/kg or more and 6000 mg/kg or less. The evaporation inhibitor composition for plant treatment agents of the present invention is preferably formulated into a treatment liquid to be applied to a plant and used. The concentration of component (A) during use of the evaporation inhibitor composition for plant treatment agents of the present invention is preferably 30 mg/kg or more, more preferably 50 mg/kg or more, further preferably 70 mg/kg or more and furthermore preferably 100 mg/kg or more, and preferably 6000 mg/kg or less, more preferably 3000 mg/kg or less, further preferably 2000 mg/kg or less, furthermore preferably 1000 mg/kg or less, furthermore preferably 500 mg/kg or less and furthermore preferably 300 mg/kg or less with respect to the treatment liquid to be applied to a plant. The content of component (A) in the evaporation inhibitor composition for plant treatment agents of the present invention may be any amount that the adjustment to this range is possible. The content of component (A) in the evaporation inhibitor composition for plant treatment agents of the present invention is preferably less than 100 mass from the viewpoint of transportation and storage efficiency, and more preferably 70 mass % or less, further preferably 50 mass % or less and furthermore preferably 20 mass % or less from the viewpoint of stability when the optional components are contained. Further, it is preferably 10 mass % or less, more preferably 5 mass % or less and further preferably 3 mass % or less from the viewpoints of ease of operation during mixing with a plant treatment agent such as an agrochemical or the like and making the concentration adjustment easy. Further, it is preferably 0.005 mass % or more, more preferably 0.01 mass % or more, further preferably 0.05 mass % or more and furthermore preferably 0.1 mass % or more from the viewpoint of improving the coverage rate.

[Agrochemical Efficacy Enhancing Agent Composition]

The present invention provides an agrochemical efficacy enhancing agent composition containing, the evaporation inhibitor for plant treatment agents of the present invention and (B) an agrochemical efficacy enhancing agent other than component (A). In other words, the present invention provides an agrochemical efficacy enhancing agent composition containing, component (A) and (B) an agrochemical efficacy enhancing agent other than component (A) [hereinafter referred to as component (B)]. The agrochemical efficacy enhancing agent composition of the present invention contains component (A) as an evaporation inhibitor for plant treatment agents.

The matters stated in the evaporation inhibitor for plant treatment agents and the evaporation inhibitor composition for plant treatment agents of the present invention can be appropriately applied to the agrochemical efficacy enhancing agent composition of the present invention. The specific examples, preferable aspects or the like of component (A) are also the same as those in the evaporation inhibitor for plant treatment agents or the like of the present invention.

The content of component (A) in the agrochemical efficacy enhancing agent composition of the present invention is preferably 80 mass % or less, more preferably 50 mass % or less, further preferably 30 mass % or less and furthermore preferably 10 mass or less from the viewpoint of formulation stability. Further, it is preferably 10 mass' or less, more preferably 5 mass % or less and further preferably 3 mass % or less from the viewpoints of ease of operation during mixing with a plant treatment agent such as an agrochemical or the like and making the concentration adjustment easy. Further, it is preferably 0.005 mass % or more, more preferably 0.01 mass % or more, further preferably 0.05 mass % or more and furthermore preferably 0.1 mass % or more from the viewpoint of improving the coverage rate.

Examples of component (B) include one or more selected from (B1) an emulsifier other than component (A) [hereinafter referred to as component (B1)] and (B2) a (poly) glycerin fatty acid ester [hereinafter referred to as component (B2)].

Examples of the agrochemical efficacy enhancing agent composition of the present invention include the agrochemical efficacy enhancing agent composition containing component (B1) as component (B).

Examples of the agrochemical efficacy enhancing agent composition of the present invention include the agrochemical efficacy enhancing agent composition containing component (B2) as component (B).

Examples of the agrochemical efficacy enhancing agent composition of the present invention include the agrochemical efficacy enhancing agent composition containing components (B1) and (B2) as component (B).

The agrochemical efficacy enhancing agent composition of the present invention preferably contains component (B1), which is an emulsifier, as component (B) from the viewpoint of improving the coverage rate. As component (B1), emulsifiers for example used during common agrochemical spraying, such as sodium dodecyl sulfate, ammonium dodecyl sulfate, sodium dodecyl benzenesulfonate, ammonium dodecyl benzenesulfonate, sodium alkyl ether sulfate, ammonium alkyl ether sulfate, polyoxyethylene distyrenated phenyl ether, polyoxyethylene tribenzyl phenyl ether, polyoxyethylene sorbitol tetraoleate, polyoxyethylene alkyl amine, quaternary ammonium salts or the like can be used. From the viewpoint of improving the coverage rate, component (B1) is preferably at least one compound selected from compounds represented by the following formulas (V) and (VI):

$$R^6O(R^8O)_nSO_3^-M^+ \tag{V}$$

$$R^7SO_3^-M^+ \tag{VI}$$

wherein in the formulas (V) and (VI), $R^6$ and $R^7$ are each independently a hydrocarbon group with 8 or more and 24 or less carbons, $R^8$ is an alkylene group with 2 or more and 4 or less carbons, n is an average number of added moles and a number of 0 or more and 30 or less, and $M^+$ is a counterion.

In the formulas (V) and (VI), $R^6$ and $R^7$ are preferably aliphatic hydrocarbon groups, more preferably alkyl groups and further preferably straight chain alkyl groups. $R^6$ and $R^7$ each have 8 or more, preferably 10 or more and more preferably 12 or more carbons from the viewpoint of improving the coverage rate, and 24 or less, preferably 16 or less and more preferably 14 or less carbons from the same viewpoint.

In the formula (V), $R^8$ has preferably 2 or more and 3 or less and more preferably 2 carbons from the viewpoint of improving the coverage rate. $R^8$ is preferably an ethylene group.

In the formula (V), n is a number of 0 or more, preferably 1 or more and more preferably 2 or more from the viewpoint of improving the coverage rate, and 30 or less, preferably 10 or less, more preferably 5 or less and further preferably 3 or less from the same viewpoint.

In the formulas (V) and (VI), $M^+$ is a counterion, examples of which include, for example, an ion of an alkali metal such as sodium, potassium or the like, ammonium ion, triethanolammonium ion, or the like, and an alkali metal ion or ammonium ion is preferable and ammonium ion is more preferable from the viewpoint of improving the coverage rate.

When the agrochemical efficacy enhancing agent composition of the present invention contains component (B1), the composition contains component (B1) in an amount of preferably 0.05 mass % or more, more preferably 0.1 mass % or more and furthermore preferably 0.5 mass % or more, and preferably 30 mass % or less, more preferably 20 mass % or less and furthermore preferably 10 mass % or less from the viewpoints of improving the coverage rate and enhancing the efficacy of an agrochemical.

The agrochemical efficacy enhancing agent composition of the present invention preferably contains component (B2), which is a (poly)glycerin fatty acid ester, as component (B) from the viewpoint of improving the coverage rate. Component (B2) is preferably a (poly)glycerin fatty acid ester in which the fatty acid has 8 or more and 16 or less carbons and the average degree of condensation of glycerin is 1 or more and 3 or less. Here, "(poly)glycerin" means "glycerin or polyglycerin."

In component (B2), the fatty acid has 8 or more and preferably 10 or more, and 16 or less, preferably 14 or less, more preferably 12 or less and further preferably 10 carbons from the viewpoint of improving the coverage rate. The fatty acid in component (B2) preferably has a straight chain or branched chain alkyl group or a straight chain or branched chain alkenyl group and more preferably has a straight chain alkyl group. Examples of the fatty acid in component (B2) include caprylic acid, capric acid, lauric acid, myristic acid, palmitic acid or the like, and capric acid and lauric acid are preferable and capric acid is more preferable from the viewpoint of improving the coverage rate. In component (B2), the average degree of condensation of glycerin is 1 or more, and 3 or less, preferably 2 or less and more preferably 2 from the viewpoint of improving the coverage rate. Further, in component (B2), the form of the ester bond is preferably monoester form and diester form and more preferably monoester form.

When the agrochemical efficacy enhancing agent composition of the present invention contains component (B2), the composition contains component (B2) in an amount of preferably 5 mass % or more, more preferably 10 mass % or more and furthermore preferably 20 mass % or more, and preferably 60 mass % or less, more preferably 50 mass or less and furthermore preferably 40 mass % or less from the viewpoints of improving the coverage rate and enhancing the efficacy of an agrochemical.

Examples of an agrochemical efficacy enhancing agent other than components (B1) and (B2) [hereinafter referred to as component (B3)] include, but are not limited to, for example, the spreading agents described in Pesticide Handbook, 2011 edition (the general incorporated association Japan Plant Protection Association, issued on Feb. 25, 2011). Examples of commercially available spreading agents include, for example, makupika (93.0 mass % of polyoxyethylene methyl polysiloxane, manufactured by ISK BIOSCIENCES K.K.), SQUASH (70 mass % of sorbitan fatty acid ester, 5.5 mass % of polyoxyethylene resin acid ester, manufactured by Kao Corporation), ABION-E (24 mass % of paraffin, manufactured by ABION CO., LTD.), Petan V (42.0 mass % of paraffin, manufactured by AGRO-KANE-SHO CO., LTD.), Submerge (50 mass % of sodium alkyl benzenesulfonate, manufactured by Syngenta AG), Breakthrough (80 mass % of polyoxyalkylene oxypropyl heptamethyltrisiloxane, 20 mass % of polyoxyalkylene propenyl ether, manufactured by Sankei Chemical Co., Ltd.) or the like.

When the agrochemical efficacy enhancing agent composition of the present invention contains component (B3), the composition contains component (B3) in an amount of preferably 99.995 mass % or less, more preferably 99.99 mass % or less, further preferably 99.95 mass % or less and furthermore preferably 99.9 mass % or less from the viewpoint of improving the coverage rate, and preferably 20 mass % or more, more preferably 70 mass % or more and further preferably 90 mass % or more from the viewpoint of enhancing the efficacy of an agrochemical.

The agrochemical efficacy enhancing agent composition of the present invention preferably contains a compound with a SP value of 8 or more and 18 or less (excluding those qualifying as components (A) and (B)) as component (C) from the viewpoint of improving the storage stability. The SP value of component (C) is preferably 8 or more, more preferably 8.4 or more and further preferably 9.5 or more, and preferably 18 or less, more preferably 16 or less and further preferably 14 or less. The SP value is a solubility parameter. In the present invention, the SP value is a value determined by the Hoy method (unit: $(cal/cm^3)^{1/2}$). Component (C) is preferably one or more compounds selected from an ester compound with 5 or less carbons, dimethyl sulfoxide and an alcohol with 1 or more and 10 or less carbons from the viewpoint of suppressing the low-temperature precipitation of the other components.

Examples of the ester compound with 5 or less carbons of component (C) include ethyl acetate (SP value 8.1), ethyl lactate (SP value 9.7), methyl acetate (SP value 8.4), methyl lactate (SP value 10.2), ethyl propionate (SP value 8.3), methyl propionate (SP value 8.3) or the like.

The SP value of dimethyl sulfoxide is 13.0.

Examples of the alcohol with 1 or more and 10 or less carbons of component (C) include ethanol (SP value 12.7), propyl alcohol (SP value 12.0), n-butanol (SP value 11.4), 2-ethylhexanol (SP value 9.5), n-decanol (SP value 9.8), glycerin (SP value 17.7), ethylene glycol (SP value 14.2) or the like.

Component (C) is preferably one or more compounds selected from ethyl lactate, dimethyl sulfoxide, propyl alcohol and n-decanol from the viewpoint of suppressing the low-temperature precipitation of the other components.

When the agrochemical efficacy enhancing agent composition of the present invention contains component (C), the composition contains component (C) in an amount of preferably 0.5 mass % or more, more preferably 1 mass % or more and further preferably 5 mass % or more, and preferably 80 mass % or less, more preferably 70 mass % or less and further preferably 50 mass % or less from the viewpoint of suppressing the low-temperature precipitation of the other components.

The agrochemical efficacy enhancing agent composition of the present invention can contain water as a solvent or a dispersion medium and components such as a chelating agent, a pH adjuster, an inorganic salt, a thickener, a defoamer or the like (excluding those qualifying as components (A), (B) and (C)).

The agrochemical efficacy enhancing agent composition of the present invention can contain water as a solvent or a dispersion medium. When the agrochemical efficacy enhancing agent composition of the present invention contains water, component (A) and the optional components (components (B) and (C)) are easily dispersed and dissolved in a dilution medium (for example, water and/or an organic solvent) during the dilution of the composition, so that, when the composition is sprayed together with an agrochemical, a step of carrying out dilution with a dilution medium to prepare a treatment liquid becomes easy.

During use of the agrochemical efficacy enhancing agent composition of the present invention, in other words, when the composition is applied to a plant together with a plant treatment agent such as an agrochemical or the like, the concentration of component (A) is preferably 30 mg/kg or more and 6000 mg/kg or less. The agrochemical efficacy enhancing agent composition of the present invention is preferably formulated into a treatment liquid to be applied to a plant and used. The concentration of component (A) during use of the agrochemical efficacy enhancing agent composition of the present invention is preferably 30 mg/kg or more, more preferably 50 mg/kg or more, further preferably 70 mg/kg or more and furthermore preferably 100 mg/kg or more, and preferably 6000 mg/kg or less, more preferably 3000 mg/kg or less, further preferably 2000 mg/kg or less, furthermore preferably 1000 mg/kg or less, furthermore preferably 500 mg/kg or less and furthermore preferably 300 mg/kg or less with respect to the treatment liquid to be applied to a plant. The content of component (A) in the agrochemical efficacy enhancing agent composition of the present invention may be any amount that the adjustment to this range is possible. The content of component (A) in the agrochemical efficacy enhancing agent composition of the present invention is preferably less than 100 mass % from the viewpoint of transportation and storage efficiency, and more preferably 70 mass % or less, further preferably 50 mass % or less and furthermore preferably 20 mass % or less from the viewpoint of stability when the optional components, for example, components (B) and (C) are used together. Further, it is preferably 10 mass % or less, more preferably 5 mass % or less and further preferably 3 mass % or less from the viewpoints of ease of operation during mixing with a plant treatment agent such as an agrochemical or the like and making the concentration adjustment easy. Further, it is preferably 0.005 mass % or more, more preferably 0.01 mass % or more, further preferably 0.05 mass % or more and furthermore preferably 0.1 mass, or more from the viewpoint of improving the coverage rate.
<Plant Treatment Agent Composition>

The present invention relates to a plant treatment agent composition containing, the evaporation inhibitor for plant treatment agents of the present invention and a plant treatment agent. In other words, the present invention provides a plant treatment agent composition containing component (A) and a plant treatment agent. The plant treatment agent composition of the present invention contains component (A) as an evaporation inhibitor for plant treatment agents.

The matters stated in the evaporation inhibitor for plant treatment agents, the evaporation inhibitor composition for plant treatment agents and the agrochemical efficacy enhancing agent composition of the present invention can be appropriately applied to the plant treatment agent composition of the present invention. For example, the specific examples or preferable aspects of component (A), the optional components or the like are also the same as those in the evaporation inhibitor for plant treatment agents or the like of the present invention.

Examples of the plant treatment agent used in the plant treatment agent composition of the present invention include a component selected from an agrochemical, a fertilizer and an antiseptic.

An agrochemical used in the plant treatment agent composition of the present invention may be either an agrochemical active ingredient or an agrochemical formulation including an agrochemical active ingredient.

Examples of the agrochemical include at least one selected from a bactericide, an insecticide, a miticide, a herbicide and a plant growth regulator.

The agrochemical active ingredient refers to a compound serving as an active component of an agrochemical. Examples of an agrochemical active ingredient used in the agrochemical include, but are not limited to, for example, those described in Pesticide Handbook, 2011 edition (the general incorporated association Japan Plant Protection Association, issued on Feb. 25, 2011).

Examples of the bactericide include, for example, those described in WO-A 2012/029893 or the like. From the viewpoint of the ability of the present invention to improve the coverage rate to enhance the efficacy of an agrochemical (hereinafter also referred to as the efficacy enhancing effect of the present invention), preferable bactericides are basic copper sulfate, organocopper (oxine-copper, bis(8-quinolinolato)copper(II)), copper(II) hydroxide, benomyl (methyl N-[1-(N-n-butylcarbamoyl)-1H-2-benzoimidazolyl]carbamate), kasugamycin (3-o-[2-amino-4-[(carboxyiminomethyl)amino]-2,3,4,6-tetradeoxy-α-D-arabino-hexopyranosyl]-D-chiro-inositol hydrochloride hydrate), tricyclazole (5-methyl-1,2,4-triazolo[3,4-b][1,3]benzothiazole), tetraconazole ((RS)-2-(2,4-dichlorophenyl)-3-(1H-1,2,4-triazol-1-yl)propyl 1,1,2,2-tetrafluoroethyl ether), tebuconazole ((RS)-1-p-chlorophenyl-4,4-dimethyl-3-(1H-1,2,4-triazol-1-ylmethyl)pentane-3-ol), propiconazole ((2RS,4RS;2RS,4SR)-1-[2-(2,4-dichlorophenyl)-4-propyl-1,3-dioxolan-2-ylmethyl]-1H-1,2,4-triazole), ferimzone ((Z)-2'-methylacetophenone 4,6-dimethylpyrimidin-2-ylhydrazone), phthalide (4,5,6,7-tetrachlorophthalide), thiophanate-methyl (dimethyl 4,4'-o-phenylene bis(3-thioallophanate)), iminoctadine acetate (1,1'-iminiodi(octamethylene)diguanidinium triacetate) and flutolanil (α,α,α-trifluoro-3'-isopropoxy-o-toluanilide), more preferable are basic copper sulfate, benomyl, ferimzone, phthalide, iminoctadine acetate and flutolanil, and further preferable are ferimzone, phthalide, iminoctadine acetate and flutolanil.

Examples of the insecticide include, for example, those described in WO-A 2012/029893 or the like. From the viewpoint of the efficacy enhancing effect of the present invention, preferable insecticide are permethrin (3-phenoxy-benzyl=3-(2,2-dichlorovinyl)-2,2-dimethylcyclopropanecarboxylate), dichlorvos (dimethyl-2,2-dichlorovinyl phosphate (DDVP)), methomyl (S-methyl-N-[(methylcarbamoyl)-oxy]-thioacetimidate), ethiprole (5-amino-1-(2,6-dichloro-α,α,α-trifluoro-p-tolyl)-4-ethyl-sulfinylpyrazole-3-carbonitrile), etofenprox (2-(4-ethoxy-phenyl)-2-methylpropyl=3-phenoxybenzyl=ether), fenitrothion (o,o-dimethyl o-4-nitro-m-tolyl phosphorothioate), acephate (O,S-dimethyl acetylphosphoramidothioate), clothianidin ((E)-1-(2-chloro-1,3-thiazol-5-ylmethyl)-3-methyl-2-nitroguanidine), dinotefuran ((RS)-1-methyl-2-nitro-3-(tetrahydro-3-furylmethyl)guanidine) and chlorantraniliprole (3-bromo-N-[4-chloro-2-methyl-6-(methylcarbamoyl)phenyl]-1-(3-chloropyridin-2-yl)-1H- pyrazole-5-carboxamide), more preferable are acephate, clothianidin, dinotefuran and chlorantraniliprole, and further preferable are clothianidin, dinotefuran and chlorantraniliprole.

Examples of the miticide include, for example, those described in WO-A 2012/029893 or the like. From the viewpoint of the efficacy enhancing effect of the present invention, preferable miticides are phenisobromolate (4,4'-isopropyl dibromobenzylate), amitraz (1,5-bis(2,4-dimethylphenyl)-3-methyl-1,3,5-triazapenta-1,4-dien) and fenpyroximate (t-butyl (E)-α-(1,3-dimethyl-5-phenoxypyrazol-4-ylmethyleneaminooxy)-p-toluate).

Examples of the herbicide include, for example, those described in WO-A 2012/029893 or the like. From the viewpoint of the efficacy enhancing effect of the present invention, preferable herbicides are DBN (2,6-dichlorobenzonitrile), diuron (DCMU, 3-(3,4-dichlorophenyl)-1,1-dimethylurea), paraquat (1,1'-dimethyl-4,4'-bipyridinium dichloride), diquat (1,1'-ethylene 2,2'-bipyridinium dibromide), glufosinate (ammonium-DL-homoalanine-4-yl (methyl)phosphinate) and glyphosate (N-(phosphonomethyl)-glycine or the salts thereof), and more preferable is glyphosate. Examples include the isopropylamine salt, the ammonium salt, the potassium salt, the sodium salt and the trimesium salt of glyphosate, and the isopropylamine salt is preferable.

The plant treatment agent composition of the present invention can contain an agrochemical efficacy enhancing agent or an agrochemical efficacy enhancing agent composition, for example, the agrochemical efficacy enhancing agent composition of the present invention. When the plant treatment agent composition of the present invention contains an agrochemical as the plant treatment agent, it preferably contains an agrochemical efficacy enhancing agent. The specific examples and preferable aspects of the agrochemical efficacy enhancing agent are the same as those in the agrochemical efficacy enhancing agent composition of the present invention.

The plant treatment agent composition of the present invention can contain the optional components described in the agrochemical efficacy enhancing agent composition. For example, the plant treatment agent composition of the present invention can contain a component selected from components (B) and (C). The specific examples and preferable aspects of these optional components are the same as those in the agrochemical efficacy enhancing agent composition of the present invention.

The plant treatment agent composition of the present invention can contain water. The plant treatment agent composition of the present invention may be, for example, obtained by dissolving or dispersing in water component (A) and a plant treatment agent, for example, an agrochemical. The water content of the plant treatment agent composition of the present invention is not particularly limited, but preferably 1 mass % or more and more preferably 10 mass % or more, and preferably 98 mass % or less and more preferably 95 mass % or less.

Examples of the plant treatment agent composition of the present invention include an agrochemical composition containing the evaporation inhibitor for plant treatment agents of the present invention, i.e., component (A) and an agrochemical.

During use of the plant treatment agent composition of the present invention, in other words, when the composition is applied to a plant, the content of component (A) is preferably 30 mg/kg or more and 6000 mg/kg or less. The content of component (A) in the plant treatment agent composition of the present invention during use is preferably 30 mg/kg or more and 6000 mg/kg or less, more preferably 50 mg/kg or more, further preferably 70 mg/kg or more and furthermore preferably 100 mg/kg or more, and more preferably 3000 mg/kg or less, further preferably 2000 mg/kg or less, furthermore preferably 1000 mg/kg or less, furthermore preferably 500 mg/kg or less and furthermore preferably 300 mg/kg or less from the viewpoint of improving the coverage rate. The content of component (A) in the plant treatment agent composition of the present invention may be any amount that the content of component (A) during use can be adjusted to fall within this range. The content of component (A) in the plant treatment agent composition of the present invention is not particularly limited, but for example, preferably 0.001 mass % or more, more preferably 0.01 mass, or more, further preferably 0.05 mass % or more and furthermore preferably 0.1 mass % or more, and preferably 30 mass, or less, more preferably 15 mass % or less, further preferably 10 mass % or less and furthermore preferably 4 mass % or less relative to the plant treatment agent such as an agrochemical or the like (in terms of an active ingredient) from the viewpoints of improving the coverage rate and enhancing the efficacy of the plant treatment agent such as an agrochemical or the like.

Note that, when the plant treatment agent composition of the present invention is an agrochemical composition, the content of an agrochemical in the composition may be any amount that can provide the general concentration during use set for the agrochemical.

When the plant treatment agent composition of the present invention contains component (B1) as component (B), the content of component (B1) in the plant treatment agent composition of the present invention during use is not particularly limited, but preferably 10 mg/kg or more and 5000 mg/kg or less, more preferably 30 mg/kg or more, further preferably 50 mg/kg or more and furthermore preferably 100 mg/kg or more, and more preferably 3000 mg/kg or less, further preferably 2000 mg/kg or less and furthermore preferably 1000 mg/kg or less from the viewpoints of improving the coverage rate and enhancing the efficacy of the plant treatment agent such as an agrochemical or the like. The content of component (B1) in the plant treatment agent composition of the present invention may be any amount that the content of component (B1) during use can be adjusted to fall within this range.

When the plant treatment agent composition of the present invention contains component (B2) as component (B), the content of component (B2) in the plant treatment agent composition of the present invention during use is not particularly limited, but preferably 50 mg/kg or more and 20000 mg/kg or less, more preferably 500 mg/kg or more, further preferably 1000 mg/kg or more and furthermore preferably 3000 mg/kg or more, and more preferably 10000 mg/kg or less, further preferably 8000 mg/kg or less and furthermore preferably 6000 mg/kg or less from the viewpoints of improving the coverage rate and enhancing the efficacy of the plant treatment agent such as an agrochemical or the like. The content of component (B2) in the plant treatment agent composition of the present invention may be any amount that the content of component (B2) during use can be adjusted to fall within this range.

When the plant treatment agent composition of the present invention contains component (B3) as component (B), the content of component (B3) in the plant treatment agent composition of the present invention during use is not particularly limited, but preferably 500 mg/kg or more and 50000 mg/kg or less, more preferably 1000 mg/kg or more, further preferably 5000 mg/kg or more and furthermore preferably 10000 mg/kg or more, and more preferably 30000 mg/kg or less, further preferably 25000 mg/kg or less and furthermore preferably 20000 mg/kg or less from the viewpoints of improving the coverage rate and enhancing the efficacy of an agrochemical. The content of component (B3) in the plant treatment agent composition of the present invention may be any amount that the content of component (B3) during use can be adjusted to fall within this range.

[Method for Treating a Plant]

The present invention provides a method for treating a plant including, a step of applying a treatment liquid that contains the evaporation inhibitor for plant treatment agents of the present invention and a plant treatment agent (hereinafter also referred to as the treatment liquid of the present invention) to the plant. The method for treating a plant of the present invention is a method for treating a plant including, a step of applying a treatment liquid that contains at least one compound selected from the aforementioned compounds (A1) to (A6) of component (A) and a plant treatment agent. The treatment liquid of the present invention preferably contains water. For example, the method for treating a plant of the present invention may be a method for treating a plant including, a step of applying a treatment liquid that contains component (A), a plant treatment agent and water to the plant.

The matters stated in the evaporation inhibitor for plant treatment agents, the evaporation inhibitor composition for plant treatment agents, the agrochemical efficacy enhancing agent composition and the plant treatment agent composition of the present invention can be appropriately applied to the method for treating a plant of the present invention. For example, the specific examples or preferable aspects of component (A), the optional components or the like are also the same as those in the evaporation inhibitor for plant treatment agents or the like of the present invention.

The evaporation inhibitor composition for plant treatment agents, the agrochemical efficacy enhancing agent composition or the plant treatment agent composition can be used as-is as the treatment liquid used in the method for treating a plant of the present invention. In other words, when the content of component (A) in these compositions is suitable for the application to the plant, they may be used as-is. Further, a diluted liquid of any of these compositions diluted with water can be used as the treatment liquid of the present invention. For example, the treatment liquid of the present invention may be the plant treatment agent composition of the present invention or a diluted liquid of the composition diluted with water. Further, the treatment liquid of the present invention may be obtained by separately mixing component (A), a plant treatment agent, and as necessary, the optional components.

The content of component (A) in the treatment liquid of the present invention applied to the plant is preferably 30 mg/kg or more and 6000 mg/kg or less. The content of component (A) is preferably 30 mg/kg or more and 6000 mg/kg or less, more preferably 50 mg/kg or more, further preferably 70 mg/kg or more and furthermore preferably 100 mg/kg or more, and more preferably 3000 mg/kg or less, further preferably 2000 mg/kg or less, furthermore preferably 1000 mg/kg or less, furthermore preferably 500 mg/kg or less and furthermore preferably 300 mg/kg or less from the viewpoint of improving the coverage rate.

The treatment liquid of the present invention can contain the aforementioned components (B) and/or (C). In that case, the content of each component in the treatment liquid of the present invention is preferably the content or the content during use stated in the plant treatment agent composition of the present invention.

In the present invention, the treatment liquid of the present invention can be applied to the plant by spraying. While common sprayers and spraying methods adopted for spraying agrochemicals or the like can be used for the spraying, aerial spraying is preferable from the viewpoint of spraying in a low spray amount and in an efficient manner. An aircraft and further an industrial multirotor (drone) having a sprayer on board are preferably used for the aerial spraying. For example, the present invention also provides a method for spraying a plant treatment agent composition, for example, an agrochemical composition, wherein the plant treatment agent composition of the present invention, for example, an agrochemical composition, is sprayed at a rate falling within the range described later.

When the treatment liquid of the present invention is sprayed, a sprayer used is not particularly limited, and a common sprayer can be used. While sprayers are classified according to the type of a power system into the human-powered type, the power-driven type or the like and those of the power-driven type are classified into the backpack type, the portable type, the running type, the flying type or the like, the present invention can be adapted to any of these types of sprayers. Specific examples include a manual sprayer, a backpack power sprayer, a set power sprayer, a carry power sprayer, a self-propelled carry power sprayer, a self-propelled radio-controlled power sprayer, a speed sprayer, a boom sprayer, an industrial unmanned helicopter, an industrial multirotor (drone) or the like. The sprayer is preferably an industrial unmanned helicopter and an industrial multirotor and more preferably an industrial multirotor from the viewpoint of exhibiting the advantageous effects of the present invention.

In the present invention, the treatment liquid of the present invention can be sprayed at a rate of 0.1 L or more and 500 L or less per 10 ares (1000 m²). The spray amount is preferably 0.1 L or more, more preferably 0.5 L or more, further preferably 0.6 L or more, furthermore preferably 0.7 L or more and furthermore preferably 0.8 L or more, and preferably 500 L or less, more preferably 200 L or less, further preferably 50 L or less and furthermore preferably 10 L or less. If the spray amount is equal to or more than the lower limit, the effect of improving the coverage rate can be fully obtained, and if it is equal to or less than the upper limit, environmental impact can be kept low. This spray amount is preferable when the content of component (A) in a spray liquid, which is the treatment liquid applied to the plant, falls within the aforementioned range.

Examples of a target plant of the present invention include a crop. Examples of the crop include, for example, barley, peas, rice, wheat, cabbages, taros, potatoes, onions, corn, strawberries, melons, eggplants, tomatoes, leeks, cruciferous vegetables, soybeans, kidney beans, sweet potatoes, cucumbers, Chinese cabbage, apples, pears, peaches, Japanese persimmon, citruses or the like. In addition to these, the present invention can be directed to trees, turf and other plants. Furthermore, the present invention can be directed to harmful plants such as so-called weeds.

When the plant is a crop in the method for treating a plant of the present invention, the treatment liquid of the present invention is preferably applied to the crop before harvesting. In other words, examples of the treating method of the present invention include, for example, a method for treating a crop including, a step of applying the treatment liquid of the present invention to the crop before harvesting.

In the present invention, the treatment liquid of the present invention is preferably brought into contact with a part of the plant at which the contact angle with water is 500 or more and 180° or less, more preferably 70° or more and 180° or less and further preferably 90° or more and 1800 or less from the viewpoint of developing the effects of the present invention. The contact angle with water of the plant can be measured in the following manner: 5 μL of water is added dropwise to the surface of the plant (for example, the surface of the third leaf) at 25° C.; 10 seconds later, an image is taken using a digital microscope ("VHX-1000" manufactured by KEYENCE CORPORATION) from the side surface of the droplet; and the contact angle is determined by a half-angle method from the taken image.

[Aspects of the Present Invention]

The present invention further discloses the following evaporation inhibitor for plant treatment agents, evaporation inhibitor composition for plant treatment agents, agrochemical efficacy enhancing agent composition, plant treatment agent composition and method for treating a plant in connection with the above embodiments. The matters stated in the evaporation inhibitor for plant treatment agents, the evaporation inhibitor composition for plant treatment agents, the agrochemical efficacy enhancing agent composition, the plant treatment agent composition and the method for treating a plant of the present invention can be appropriately applied to these aspects, and vice versa.

<1>

An evaporation inhibitor for plant treatment agents composed of (A) at least one compound selected from the following compounds (A1) to (A6) [hereinafter referred to as component (A)]:

<Compound (A1)>
　a compound obtained by adding at least one alkylene oxide (hereinafter referred to as AO) selected from ethylene oxide (hereinafter referred to as EO) and propylene oxide (hereinafter referred to as PO) at an average number of added moles of 1 or more and 22 or less to a compound of the following formula (I):

$$R^1OH \qquad \text{(I)}$$

wherein in the formula (I), $R^1$ is an alkyl group with 10 or more and 14 or less carbons or an alkenyl group with 10 or more and 14 or less carbons;

<Compound (A2)>
　a compound obtained by adding at least one AO selected from EO and PO at an average number of added moles of 1 or more and 22 or less to a compound of the following formula (II):

$$R^2-COOH \qquad \text{(II)}$$

wherein in the formula (II), $R^2$ is an alkyl group with 11 or more and 19 or less carbons or an alkenyl group with 11 or more and 19 or less carbons;

<Compound (A3)>
　a compound obtained by adding at least one AO selected from EO and PO at an average number of added moles of 1 or more and 22 or less to a monoester of a fatty acid with 10 or more and 20 or less carbons and sorbitan;

<Compound (A4)>
　a polyalkylene glycol with a weight average molecular weight of 100 or more and 3000 or less;

<Compound (A5)>
　a compound represented by the following formula (III):

$$R^3-COO-R^4 \qquad \text{(III)}$$

wherein in the formula (III), $R^3$ is an alkyl group with 15 or more and 19 or less carbons, and $R^4$ is an alkyl group with 1 or more and 18 or less carbons; and <Compound (A6)>
　a compound represented by the following formula (IV):

$$R^5-COOH \qquad \text{(IV)}$$

wherein in the formula (IV), $R^5$ is an alkyl group with 7 or more and 19 or less carbons or an alkenyl group with 7 or more and 19 or less carbons.

<2>
The evaporation inhibitor for plant treatment agents according to <1>, wherein AO in compound (A1) includes EO.

<3>
The evaporation inhibitor for plant treatment agents according to <1> or <2>, wherein the average number of added moles of AO in compound (A1) is 1 or more, preferably 2 or more, more preferably 3 or more, further preferably 4 or more and furthermore preferably 5 or more, and 22 or less, preferably 20 or less, more preferably 18 or less and further preferably 15 or less.

<4>
The evaporation inhibitor for plant treatment agents according to any of <1> to <3>, wherein $R^1$ in the formula (I) of compound (A1) has 10 or more and preferably 11 or more, and 14 or less, preferably 13 or less and more preferably 12 carbons.

<5>
The evaporation inhibitor for plant treatment agents according to any of <1> to <4>, wherein $R^1$ in the formula (I) of compound (A1) is a straight chain or a branched chain, preferably a straight chain or branched chain alkyl group, and more preferably a straight chain alkyl group.

<6>
The evaporation inhibitor for plant treatment agents according to any of <1> to <5>, wherein compound (A1) is preferably a polyoxyethylene (1 or more and 22 or less) dodecyl ether, more preferably a polyoxyethylene (5 or more and 12 or less) dodecyl ether, and further preferably polyoxyethylene (6) dodecyl ether.

<7>
The evaporation inhibitor for plant treatment agents according to any of <1> to <6>, wherein AO in compound (A2) includes EO.

<8>
The evaporation inhibitor for plant treatment agents according to any of <1> to <7>, wherein the average number of added moles of AO in compound (A2) is 1 or more, preferably 2 or more, more preferably 3 or more, further preferably 4 or more and furthermore preferably 5 or more, and 22 or less, preferably 20 or less, more preferably 18 or less and further preferably 15 or less.

<9>

The evaporation inhibitor for plant treatment agents according to any of <1> to <8>, wherein $R^2$ in the formula (II) of compound (A2) has 11 or more, preferably 13 or more and more preferably 15 or more, and 19 or less, preferably 18 or less and more preferably 17 or less carbons.

<10>

The evaporation inhibitor for plant treatment agents according to any of <1> to <9>, wherein $R^2$ in the formula (II) of compound (A2) is a straight chain or a branched chain, preferably a straight chain alkyl group or a straight chain alkenyl group, and more preferably a straight chain alkenyl group.

<11>

The evaporation inhibitor for plant treatment agents according to any of <1> to <10>, wherein compound (A2) is a compound selected from a polyoxyethylene (1 or more and 22 or less) laurate, a polyoxyethylene (1 or more and 22 or less) myristate, a polyoxyethylene (1 or more and 22 or less) palmitate, a polyoxyethylene (1 or more and 22 or less) stearate, a polyoxyethylene (1 or more and 22 or less) oleate and the compounds obtained by replacing oxyethylene of theirs in whole or part with oxypropylene, preferably a polyoxyethylene (1 or more and 22 or less) oleate, more preferably a polyoxyethylene (5 or more and 12 or less) oleate, and further preferably polyoxyethylene (10) oleate.

<12>

The evaporation inhibitor for plant treatment agents according to any of <1> to <11>, wherein AO in compound (A3) includes EO.

<13>

The evaporation inhibitor for plant treatment agents according to any of <1> to <12>, wherein the average number of added moles of AO in compound (A3) is 1 or more, preferably 2 or more, more preferably 3 or more, further preferably 4 or more and furthermore preferably 5 or more, and 22 or less, preferably 20 or less, more preferably 18 or less and further preferably 15 or less.

<14>

The evaporation inhibitor for plant treatment agents according to any of <1> to <13>, wherein the fatty acid of a constituent of compound (A3) has 10 or more, preferably 11 or more and more preferably 12 or more, and 20 or less, preferably 18 or less and more preferably 16 or less carbons.

<15>

The evaporation inhibitor for plant treatment agents according to any of <1> to <14>, wherein the fatty acid of a constituent of compound (A3) is saturated or unsaturated, preferably a straight chain saturated fatty acid or unsaturated fatty acid, and more preferably a straight chain saturated fatty acid.

<16>

The evaporation inhibitor for plant treatment agents according to any of <1> to <15>, wherein the fatty acid of a constituent of compound (A3) is a fatty acid selected from decanoic acid, dodecanoic acid, tetradecanoic acid, hexadecanoic acid, octadecanoic acid, eicosanoic acid, dodecenoic acid, tetradecenoic acid, hexadecenoic acid, oleic acid, linoleic acid and linolenic acid, preferably a fatty acid selected from dodecanoic acid, tetradecanoic acid and oleic acid, and more preferably dodecanoic acid.

<17>

The evaporation inhibitor for plant treatment agents according to any of <1> to <16>, wherein the monoester of a fatty acid and sorbitan of a constituent of compound (A3) is a compound selected from sorbitan monolaurate, sorbitan monomyristate, sorbitan monopalmitate, sorbitan monostearate and sorbitan monooleate, preferably a compound selected from sorbitan monolaurate, sorbitan monomyristate and sorbitan monooleate, and more preferably sorbitan monolaurate.

<18>

The evaporation inhibitor for plant treatment agents according to any of <1> to <17>, wherein compound (A3) is a compound selected from a polyoxyethylene (1 or more and 22 or less) sorbitan monolaurate, a polyoxyethylene (1 or more and 22 or less) sorbitan monomyristate, a polyoxyethylene (1 or more and 22 or less) sorbitan monopalmitate, a polyoxyethylene (1 or more and 22 or less) sorbitan monostearate, a polyoxyethylene (1 or more and 22 or less) sorbitan monooleate and the compounds obtained by replacing oxyethylene of theirs in whole or part with oxypropylene, preferably a polyoxyethylene (1 or more and 22 or less) sorbitan monolaurate, more preferably a polyoxyethylene (5 or more and 12 or less) sorbitan monolaurate, and further preferably polyoxyethylene (6) sorbitan monolaurate.

<19>

The evaporation inhibitor for plant treatment agents according to any of <1> to <18>, wherein the weight average molecular weight of compound (A4) is 100 or more, preferably 150 or more and more preferably 200 or more, and 3000 or less, preferably 2500 or less and more preferably 2000 or less.

<20>

The evaporation inhibitor for plant treatment agents according to any of <1> to <19>, wherein compound (A4) is a compound selected from the following compounds (A4-1) and (A4-2):

<Compound (A4-1)> a polyethylene glycol with a weight average molecular weight of 100 or more and 3000 or less; and <Compound (A4-2)> a polypropylene glycol with a weight average molecular weight of 800 or more and 3000 or less.

<21>

The evaporation inhibitor for plant treatment agents according to any of <1> to <20>, wherein $R^3$ in the formula (III) of compound (A5) has 15 or more and preferably 16 or more, and 19 or less, preferably 18 or less and more preferably 17 carbons.

<22>

The evaporation inhibitor for plant treatment agents according to any of <1> to <21>, wherein $R^3$ in the formula (III) of compound (A5) is a straight chain or a branched chain, and preferably a straight chain alkyl group.

<23>

The evaporation inhibitor for plant treatment agents according to any of <1> to <22>, wherein compound (A5) is a compound selected from methyl palmitate, methyl stearate, ethyl palmitate, ethyl stearate, isopropyl palmitate, isopropyl stearate, n-butyl palmitate, n-butyl stearate, isobutyl palmitate, isobutyl stearate, t-butyl palmitate, t-butyl stearate, n-octyl palmitate, n-octyl stearate, 2-ethylhexyl palmitate, 2-ethylhexyl stearate, decyl palmitate, decyl stearate, dodecyl palmitate, dodecyl stearate, isotridecyl palmitate, isotridecyl stearate, hexadecyl palmitate, hexadecyl stearate, 2-hexyldecyl palmitate, 2-hexyldecyl stearate and stearyl stearate, preferably a compound selected from isopropyl palmitate, isopropyl stearate, isobutyl palmitate, isobutyl stearate, t-butyl palmitate, t-butyl stearate, 2-ethylhexyl palmitate, 2-ethylhexyl stearate, decyl palmitate, decyl stearate, dodecyl palmitate, dodecyl stearate, isotridecyl palmitate, isotridecyl stearate, hexadecyl palmitate, hexadecyl stearate, 2-hexyldecyl palmitate and 2-hexyldecyl stearate, more preferably a compound selected from 2-ethylhexyl palmitate, 2-ethylhexyl stearate, decyl palmitate, decyl stearate, dodecyl palmitate, dodecyl stearate, isotridecyl palmitate, isotridecyl stearate, 2-hexyldecyl palmitate and 2-hexyldecyl stearate, further preferably a compound selected from dodecyl stearate, isotridecyl stearate and 2-hexyldecyl stearate, and furthermore preferably isotridecyl stearate.

<24>

The evaporation inhibitor for plant treatment agents according to any of <1> to <23>, wherein $R^5$ in the formula (IV) of compound (A6) has 7 or more, preferably 8 or more and more preferably 9 or more, and 19 or less, preferably 17 or less and more preferably 15 or less carbons.

<25>

The evaporation inhibitor for plant treatment agents according to any of <1> to <24>, wherein $R^5$ in the formula (IV) of compound (A6) is a straight chain or a branched chain, preferably a straight chain or branched chain alkyl group, and more preferably a straight chain alkyl group.

<26>

The evaporation inhibitor for plant treatment agents according to any of <1> to <25>, wherein compound (A6) is a compound selected from caprylic acid, capric acid, lauric acid, myristic acid, palmitic acid, stearic acid and oleic acid, preferably a compound selected from capric acid and oleic acid, and more preferably capric acid.

<27>

The evaporation inhibitor for plant treatment agents according to any of <1> to <26>, wherein the evaporation inhibitor is formulated into a treatment liquid to be applied to a plant and used, and the concentration of component (A) during use is preferably 30 mg/kg or more, more preferably 50 mg/kg or more, further preferably 70 mg/kg or more and furthermore preferably 100 mg/kg or more, and preferably 6000 mg/kg or less, more preferably 3000 mg/kg or less, further preferably 2000 mg/kg or less, furthermore preferably 1000 mg/kg or less, furthermore preferably 500 mg/kg or less and furthermore preferably 300 mg/kg or less with respect to the treatment liquid to be applied to a plant.

<28>

An evaporation inhibitor composition for plant treatment agents containing, the evaporation inhibitor for plant treatment agents according to any of <1> to <27>.

<29>

The evaporation inhibitor composition for plant treatment agents according to <28>, wherein the composition is formulated into a treatment liquid to be applied to a plant and used, and the concentration of component (A) during use is preferably 30 mg/kg or more, more preferably 50 mg/kg or more, further preferably 70 mg/kg or more and furthermore preferably 100 mg/kg or more, and preferably 6000 mg/kg or less, more preferably 3000 mg/kg or less, further preferably 2000 mg/kg or less, furthermore preferably 1000 mg/kg or less, furthermore preferably 500 mg/kg or less and furthermore preferably 300 mg/kg or less with respect to the treatment liquid to be applied to a plant.

<30>

The evaporation inhibitor composition for plant treatment agents according to <28> or <29>, wherein the content of component (A) is less than 100 mass %, preferably 70 mass % or less, more preferably 50 mass or less, further preferably 20 mass % or less, furthermore preferably 10 mass % or less, furthermore preferably 5 mass % or less and furthermore preferably 3 mass % or less, and 0.005 mass % or more, preferably 0.01 mass % or more, more preferably 0.05 mass % or more and further preferably 0.1 mass % or more.

<31>

An agrochemical efficacy enhancing agent composition containing, the evaporation inhibitor for plant treatment agents according to any of <1> to <27> and (B) an agrochemical efficacy enhancing agent other than component (A) [hereinafter referred to as component (B)].

<32>

The agrochemical efficacy enhancing agent composition according to <31>, wherein the content of component (A) is 80 mass or less, preferably 50 mass % or less, more preferably 30 mass % or less, further preferably 10 mass % or less, furthermore preferably 5 mass % or less and furthermore preferably 3 mass % or less, and 0.005 mass % or more, preferably 0.01 mass % or more, more preferably 0.05 mass % or more and further preferably 0.1 mass % or more.

<33>

The agrochemical efficacy enhancing agent composition according to <31> or <32>, wherein the composition contains one or more selected from (B1) an emulsifier other than component (A) [hereinafter referred to as component (B1)] and (B2) a (poly)glycerin fatty acid ester [hereinafter referred to as component (B2)] as component (B).

<34>

The agrochemical efficacy enhancing agent composition according to <33>, wherein component (B1) is at least one compound selected from compounds represented by the following formulas (V) and (VI):

$$R^6O(R^8O)_nSO_3^-M^+ \tag{V}$$

$$R^7SO_3^-M^+ \tag{VI}$$

wherein in the formulas (V) and (VI), $R^6$ and $R^7$ are each independently a hydrocarbon group, preferably an aliphatic hydrocarbon group, more preferably an alkyl group and further preferably a straight chain alkyl group with 8 or more, preferably 10 or more and more preferably 12 or more, and 24 or less, preferably 16 or less and more preferably 14 or less carbons; $R^8$ is an alkylene group with 2 or more, and 4 or less, preferably 3 or less and more preferably 2 carbons; n is an average number of added moles, and a number of 0 or more, preferably 1 or more and more preferably 2 or more, and 30 or less, preferably 10 or less, more preferably 5 or less and further preferably 3 or less; and $M^+$ is a counterion, and preferably an alkali metal ion, ammonium ion or triethanolammonium ion, more preferably an alkali metal ion or ammonium ion and further preferably ammonium ion.

<35>

The agrochemical efficacy enhancing agent composition according to <33> or <34>, wherein the composition contains component (B1) in an amount of preferably 0.05 mass or more, more preferably 0.1 mass % or more and furthermore preferably 0.5 mass % or more, and preferably 30 mass % or less, more preferably 20 mass % or less and furthermore preferably 10 mass % or less.

<36>

The agrochemical efficacy enhancing agent composition according to any of <33> to <35>, wherein component (B2) is a (poly)glycerin fatty acid ester in which the fatty acid has 8 or more and 16 or less carbons and the average degree of condensation of glycerin is 1 or more and 3 or less.
<37>
The agrochemical efficacy enhancing agent composition according to any of <33> to <36>, wherein in component (B2), the fatty acid has 8 or more and preferably 10 or more, and 16 or less, preferably 14 or less, more preferably 12 or less and further preferably 10 carbons.
<38>
The agrochemical efficacy enhancing agent composition according to any of <33> to <36>, wherein in component (B2), the fatty acid is a fatty acid having a straight chain or branched chain alkyl group or a straight chain or branched chain alkenyl group, preferably a fatty acid having a straight chain alkyl group and more preferably a fatty acid selected from caprylic acid, capric acid, lauric acid, myristic acid and palmitic acid.
<39>
The agrochemical efficacy enhancing agent composition according to any of <33> to <38>, wherein in component (B2), the average degree of condensation of glycerin is 1 or more, and 3 or less, preferably 2 or less and more preferably 2.
<40>
The agrochemical efficacy enhancing agent composition according to any of <33> to <39>, wherein in component (B2), the form of the ester bond is monoester form and/or diester form and preferably monoester form.
<41>
The agrochemical efficacy enhancing agent composition according to any of <31> to <40>, wherein the composition contains a compound with a SP value of preferably 8 or more, more preferably 8.4 or more and further preferably 9.5 or more, and preferably 18 or less, more preferably 16 or less and further preferably 14 or less as component (C).
<42>
The agrochemical efficacy enhancing agent composition according to any of <31> to <41>, wherein the composition is formulated into a treatment liquid to be applied to a plant and used, and the concentration of component (A) during use is preferably 30 mg/kg or more, more preferably 50 mg/kg or more, further preferably 70 mg/kg or more and furthermore preferably 100 mg/kg or more, and preferably 6000 mg/kg or less, more preferably 3000 mg/kg or less, further preferably 2000 mg/kg or less, furthermore preferably 1000 mg/kg or less, furthermore preferably 500 mg/kg or less and furthermore preferably 300 mg/kg or less with respect to the treatment liquid to be applied to a plant.
<43>
The agrochemical efficacy enhancing agent composition according to any of <31> to <42>, wherein the content of component (A) is less than 100 mass %, preferably 70 mass % or less, more preferably 50 mass % or less, further preferably 20 mass % or less, furthermore preferably 10 mass % or less, furthermore preferably 5 mass % or less and furthermore preferably 3 mass % or less, and 0.005 mass, or more, preferably 0.01 mass % or more, more preferably 0.05 mass % or more and further preferably 0.1 mass % or more.
<44>
A plant treatment agent composition containing, the evaporation inhibitor for plant treatment agents according to any of <1> to <27> and a plant treatment agent.
<45>
The plant treatment agent composition according to <44>, wherein the plant treatment agent is a component selected from an agrochemical, a fertilizer and an antiseptic, and further an agrochemical.

<46>
The plant treatment agent composition according to <45>, wherein the agrochemical is at least one selected from a bactericide, an insecticide, a miticide, a herbicide and a plant growth regulator.
<47>
The plant treatment agent composition according to any of <44> to <46>, wherein the composition contains (B) an agrochemical efficacy enhancing agent other than component (A) [hereinafter referred to as component (B)].
<48>
The plant treatment agent composition according to <47>, wherein the composition contains one or more selected from (B1) an emulsifier other than component (A) [hereinafter referred as component (B1)] and (B2) a (poly)glycerin fatty acid ester [hereinafter referred to as component (B2)] as component (B).
<49>
The plant treatment agent composition according to <47> or <48>, wherein the composition contains component (B1), and the content of component (B1) during use is preferably 10 mg/kg or more, more preferably 30 mg/kg or more, further preferably 50 mg/kg or more and furthermore preferably 100 mg/kg or more, and preferably 5000 mg/kg or less, more preferably 3000 mg/kg or less, further preferably 2000 mg/kg or less and furthermore preferably 1000 mg/kg or less.
<50>
The plant treatment agent composition according to any of <47> to <49>, wherein the composition contains component (B2), and the content of component (B2) during use is preferably 50 mg/kg or more, more preferably 500 mg/kg or more, further preferably 1000 mg/kg or more and furthermore preferably 3000 mg/kg or more, and preferably 20000 mg/kg or less, more preferably 10000 mg/kg or less, further preferably 8000 mg/kg or less and furthermore preferably 6000 mg/kg or less.
<51>
The plant treatment agent composition according to any of <47> to <50>, wherein the composition contains an agrochemical efficacy enhancing agent other than components (B1) and (B2) [hereinafter referred to as component (B3)] as component (B), and the content of component (B3) during use is preferably 500 mg/kg or more, more preferably 1000 mg/kg or more, further preferably 5000 mg/kg or more and furthermore preferably 10000 mg/kg or more, and preferably 50000 mg/kg or less, more preferably 30000 mg/kg or less, further preferably 25000 mg/kg or less and furthermore preferably 20000 mg/kg or less.
<52>
The plant treatment agent composition according to any of <44> to <51>, wherein the content of component (A) during use is preferably 30 mg/kg or more, more preferably 50 mg/kg or more, further preferably 70 mg/kg or more and furthermore preferably 100 mg/kg or more, and preferably 6000 mg/kg or less, more preferably 3000 mg/kg or less, further preferably 2000 mg/kg or less, furthermore preferably 1000 mg/kg or less, furthermore preferably 500 mg/kg or less and furthermore preferably 300 mg/kg or less.
<53>
The plant treatment agent composition according to any of <44> to <52>, wherein the composition contains water.
<54>
The plant treatment agent composition according to <53>, wherein the water content is preferably 1 mass % or more and more preferably 10 mass or more, and preferably 98 mass % or less and more preferably 95 mass % or less.

<55>

A method for treating a plant including, a step of applying a treatment liquid that contains the evaporation inhibitor for plant treatment agents according to any of <1> to <27> and a plant treatment agent to the plant.

<56>

The method for treating a plant according to <55>, wherein the treatment liquid is the plant treatment agent composition according to any of <44> to <54> or a diluted liquid of the composition diluted with water.

<57>

The method for treating a plant according to <55> or <56>, wherein the treatment liquid contains component (A) in an amount of preferably 30 mg/kg or more, more preferably 50 mg/kg or more, further preferably 70 mg/kg or more and furthermore preferably 100 mg/kg or more, and preferably 6000 mg/kg or less, more preferably 3000 mg/kg or less, further preferably 2000 mg/kg or less, furthermore preferably 1000 mg/kg or less, furthermore preferably 500 mg/kg or less and furthermore preferably 300 mg/kg or less.

<58>

The method for treating a plant according to any of <55> to <57>, wherein the treatment liquid is applied to the plant by aerial spraying.

<59>

The method for treating a plant according to <58>, wherein the aerial spraying is carried out using a sprayer, further carried out using a sprayer selected from a manual sprayer, a backpack power sprayer, a set power sprayer, a carry power sprayer, a self-propelled carry power sprayer, a self-propelled radio-controlled power sprayer, a speed sprayer, a boom sprayer, an industrial unmanned helicopter and an industrial multirotor (drone), further carried out using a sprayer selected from an industrial unmanned helicopter and an industrial multirotor, and further carried out using an industrial multirotor.

<60>

The method for treating a plant according to <58> or <59>, wherein the aerial spraying is carried out by an aircraft.

<61>

The method for treating a plant according to <60>, wherein the aircraft is an industrial multirotor.

<62>

The method for treating a plant according to any of <55> to <61>, wherein the treatment liquid is sprayed at a rate of preferably 0.1 L or more, more preferably 0.5 L or more, further preferably 0.6 L or more, furthermore preferably 0.7 L or more and furthermore preferably 0.8 L or more, and preferably 500 L or less, more preferably 200 L or less, further preferably 50 L or less and furthermore preferably 10 L or less per 10 ares (1000 m$^2$).

<63>

The method for treating a plant according to any of <55> to <62>, wherein the plant is a crop.

<64>

The method for treating a plant according to <63>, wherein the crop is a plant selected from barley, peas, rice, wheat, cabbages, taros, potatoes, onions, corn, strawberries, melons, eggplants, tomatoes, leeks, cruciferous vegetables, soybeans, kidney beans, sweet potatoes, cucumbers, Chinese cabbage, apples, pears, peaches, Japanese persimmon and citruses.

<65>

The method for treating a plant according to any of <55> to <64>, wherein the plant is a crop, and the treatment liquid is applied to the crop before harvesting.

<66>

The method for treating a plant according to any of <55> to <62>, wherein the plant is a plant selected from trees and turf.

<67>

The method for treating a plant according to any of <55> to <62>, wherein the plant is a harmful plant and further a weed.

<68>

The method for treating a plant according to any of <55> to <67>, wherein the treatment liquid is brought into contact with a part of the plant at which the contact angle with water is 500 or more, further 70° or more and further 90° or more, and 180° or less.

EXAMPLES

The components used in the examples and comparative examples are listed below. The products were used as-is as the respective components. The parts by mass in the tables are expressed on the basis of the amount thereof.

[Component (A)]

A-1: "RHEODOL TW-L106" (polyoxyethylene (6) sorbitan monolaurate, manufactured by Kao Corporation)

A-2: polyoxyethylene (10) oleate

A-3: polyoxyethylene (6) lauryl ether

A-4: "EXCEPARL TD-S" (isotridecyl stearate, manufactured by Kao Corporation)

A-5: "Polyethylene Glycol 2000" (polyethylene glycol, manufactured by Tokyo Chemical Industry Co., Ltd., average molecular weight of 1850 to 2150)

A-6: "Polypropylene Glycol, Diol Type, 2,000" (polypropylene glycol, manufactured by FUJIFILM Wako Pure Chemical Corporation, average molecular weight of about 2000)

A-7: "LUNAC 1098" (capric acid, manufactured by Kao Corporation)

A-8: oleic acid (manufactured by FUJIFILM Wako Pure Chemical Corporation)

[Component (B)]

<Component (B1)>

B1-1: "LATEMUL AD-25" (ammonium lauryl sulfate, manufactured by Kao Corporation, 24.0 mass % aqueous solution)

B1-2: "RHEODOL 440V" (polyoxyethylene (40) sorbitol tetraoleate, manufactured by Kao Corporation)

<Component (B2)>

B2-1: "Sunsoft No. 760-C" (glyceryl caprate, manufactured by Taiyo Kagaku Co., Ltd.)

<Component (B3)>

B3-1: "makupika" (93.0 mass % of polyoxyethylene methyl polysiloxane, manufactured by ISK BIOSCIENCES K.K.)

B3-2: "SQUASH" (70 mass % of sorbitan fatty acid ester, 5.5 mass' of polyoxyethylene resin acid ester, manufactured by Kao Corporation)

[Component (C)]

C-1: "KALCOL 1098" (n-decanol, manufactured by Kao Corporation)

C-2: "DMSO" (dimethyl sulfoxide, manufactured by Toray Fine Chemicals Co., Ltd.)

[Agrochemical]

Agrochemical 1: "BLASINDANTOTSU® FLOWABLE" (6.6 mass % of clothianidin, 15.0 mass % of ferimzone, 15.0 mass % of phthalide, manufactured by SUMITOMO CHEMICAL COMPANY, LIMITED)

Agrochemical 2: "Topsin M Sol" (40.0 mass % of methyl thiophanate, manufactured by Nippon Soda Co., Ltd.)

Agrochemical 3: "Starklemate Liquid 10" (10.0 mass % of dinotefuran, manufactured by Mitsui Chemicals Agro, Inc.)

Agrochemical 4: "MONCUT® BEFRAN® FLOWABLE" (10.0 mass % of iminoctadine acetate, 20.0 mass % of flutolanil, manufactured by Nippon Soda Co., Ltd.)

Agrochemical 5: Prevason® Flowable 5 (5.0 mass % of chlorantraniliprole, manufactured by FMC Corporation)

[Agrochemical Efficacy Enhancing Agent Composition]

D-1 to D-7: agrochemical efficacy enhancing agent compositions shown in Table 1

Note that D-6 and D-7 are also evaporation inhibitor compositions for plant treatment agents.

the floor at each of the positions 1 to 6 in the plot of 0.5 m×1.0 m shown in FIG. 1, and the head of the spray article was pushed at a height of 2 m above the center point of each of the eight equal parts of the plot. One push discharges 62.5 μL, so that the total discharge amount of 8 pushes is 0.5 mL, which is equivalent to 1.0 L/10 ares. After the agrochemical composition was sprayed, the surface of the sample was observed using a digital microscope ("VHX-1000," manu-

TABLE 1

| | | | Agrochemical efficacy enhancing agent composition | | | | | | |
|---|---|---|---|---|---|---|---|---|---|
| | | | D-1 | D-2 | D-3 | D-4 | D-5 | D-6 | D-7 |
| Formulation (mass %) | (A) | A-1 | — | — | — | — | — | 1.64 | — |
| | | A-7 | — | — | — | — | — | — | 0.66 |
| | (B) (B1) | B1-1 | 5.88 | 100 | 9.43 | 12.95 | — | 5.78 | 5.84 |
| | | B1-2 | — | — | — | — | 12.95 | — | — |
| | (B2) | B2-1 | 39.53 | — | 63.40 | 87.05 | 87.05 | 38.89 | 39.27 |
| | (C) | C-1 | 16.94 | — | 27.17 | — | — | 16.66 | 16.83 |
| | | C-2 | 37.65 | — | — | — | — | 37.03 | 37.40 |

[Other Components]

Water: pure water of 1 μS/cm or less produced by the pure water apparatus G-10DSTSET manufactured by ORGANO CORPORATION Examples 1 to 7 and Comparative Examples 1 to 7

The agrochemical compositions shown in Tables 2 to 8 were prepared using the above components. Using the obtained agrochemical compositions, coverage rates on target objects were measured in the method described below. Relative values with respect to the blank of each test group are also shown together with the coverage rates. Some of the ratios to blank in the tables correspond to the above coverage rate ratio. The results are shown in Tables 2 to 8. Note that the agrochemical compositions in Tables 2 to 8 correspond to a treatment liquid to be applied to a plant.

<Coverage Rate Measurement Method 1>

A polypropylene spray vial (manufactured by Maruemu Corporation, No. 6) was filled with each agrochemical composition to prepare a spray article to be used for evaluations. Under an indoor windless environment at an air temperature of 21° C. and a humidity of 40%, an acrylic plate (manufactured by HIKARI CO., LTD., 160 mm×180 mm), on which a sample (water sensitive paper or a cut-off plant leaf) was stuck with a double-sided tape, was fixed to factured by KEYENCE CORPORATION) to determine the area of a discolored part, and the average value of those obtained at the six positions was used as the coverage rate (%). Note that the area of a part of the water sensitive paper discolored from yellow to blue and the area of a part of the plant leaf colored white were each defined as the covered area.

Water sensitive paper: water sensitive test paper (model number 20301-1N, 76 mm×26 mm, manufactured by Spraying Systems Co.)

Plant leaf: a leaf of a rice plant (Koshihikari rice, tillering stage) (contact angle with water of 141°)

Example 1 and Comparative Example 1

Using the agrochemical compositions shown in Table 2, the coverage rates on the water sensitive paper and the plant leaf were determined.

Table 2 shows that the agrochemical compositions using component (A) have higher coverage rates on the water sensitive paper than their respective blanks not containing component (A) regardless of agrochemicals therein, indicating that the evaporation can be inhibited. Further, the compositions with improved coverage rates also had improved coverage rates on the surface of the plant leaf, from which it is understood that the agrochemicals spread wetly after covering, thereby also increasing the spread area on the surface of the leaf.

TABLE 2

| | | | Agrochemical composition | | | | | | |
|---|---|---|---|---|---|---|---|---|---|
| | | | Agrochemical | | Evaporation inhibitor [component (A)] | | Water | Evaluation Water sensitive paper | |
| | | | Type | Parts by mass | Type | Parts by mass | Parts by mass | Coverage rate (%) | Ratio to blank |
| Test group 1a | 1a-1 | Agrochemical 1 | 125000 | A-1 | 250 | 874750 | 5.1 | 3.40 |
| | 1a-2 | | | A-2 | 250 | 874750 | 4.8 | 3.20 |
| | 1a-3 | | | A-3 | 250 | 874750 | 3.9 | 2.60 |
| | 1a-4 | | | A-4 | 250 | 874750 | 4.2 | 2.80 |
| | 1a-5 | | | A-5 | 250 | 874750 | 4.5 | 3.00 |
| | 1a-6 | | | A-6 | 250 | 874750 | 4.1 | 2.73 |
| | 1a-7 | | | A-7 | 100 | 874900 | 5.3 | 3.53 |
| | 1a-8 | | | A-8 | 100 | 874900 | 4.3 | 2.87 |
| | Blank (comparative example 1a) | | | — | — | 875000 | 1.5 | — |

TABLE 2-continued

| | | Agrochemical | | Evaporation inhibitor [component (A)] | | Water | Evaluation Water sensitive paper | |
|---|---|---|---|---|---|---|---|---|
| | | Type | Parts by mass | Type | Parts by mass | Parts by mass | Coverage rate (%) | Ratio to blank |
| 1b | 1b-1 | Agrochemical 2 | 250000 | A-1 | 250 | 749750 | 2.7 | 1.80 |
| | 1b-2 | | | A-7 | 100 | 749900 | 4.6 | 3.07 |
| | Blank (comparative example 1b) | | | — | — | 750000 | 1.5 | — |
| 1c | 1c-1 | Agrochemical 3 | 125000 | A-1 | 250 | 874750 | 4.5 | 1.41 |
| | 1c-2 | | | A-7 | 100 | 874900 | 11.2 | 3.50 |
| | Blank (comparative example 1c) | | | — | — | 875000 | 3.2 | — |
| 1d | 1d-1 | Agrochemical 4 | 250000 | A-1 | 250 | 749750 | 6.0 | 2.40 |
| | 1d-2 | | | A-7 | 100 | 749900 | 6.3 | 2.52 |
| | Blank (comparative example 1d) | | | — | — | 750000 | 2.5 | — |
| 1e | 1e-1 | Agrochemical 5 | 62500 | A-1 | 250 | 937250 | 2.9 | 1.45 |
| | 1e-1 | | | A-7 | 100 | 937400 | 12.2 | 6.10 |
| | Blank (comparative example 1e) | | | — | — | 937500 | 2.0 | — |

Example 2 and Comparative Example 2

Using the agrochemical compositions shown in Table 3, the coverage rates on the water sensitive paper and the plant leaf were determined.

Table 3 shows that the agrochemical compositions using component (A) have higher coverage rates on the water sensitive paper than their respective blanks not containing component (A), indicating that the evaporation can be inhibited. Further, the compositions with improved coverage rates also had improved coverage rates on the surface of the plant leaf, from which it is understood that the agrochemicals spread wetly after covering, thereby also increasing the spread area on the surface of the leaf.

TABLE 3

| | | | Agrochemical composition | | | | Evaporation inhibitor [component (A)] | | Water | Evaluation Water sensitive paper | | Rice plant | |
|---|---|---|---|---|---|---|---|---|---|---|---|---|---|
| | | | Agrochemical | | Component used together | | | | | | | | |
| | | | Type | Parts by mass | Type | Parts by mass | Type | Parts by mass | Parts by mass | coverage rate (%) | Ratio to blank | Coverage rate (%) | Ratio to blank |
| Test group | 2a | 2a-1 | Agrochemical 1 | 125000 | D-1 | 15000 | A-1 | 250 | 859750 | 8.5 | 3.70 | 32.7 | 1.17 |
| | | 2a-2 | | | | | A-7 | 100 | 859900 | 7.8 | 3.39 | 39.9 | 1.43 |
| | | Blank (comparative example 2a) | | | | | — | — | 860000 | 2.3 | — | 28.0 | — |
| | 2b | 2b-1 | Agrochemical 1 | 125000 | D-2 | 882 | A-1 | 250 | 873868 | 6.2 | 2.70 | 9.8 | 1.66 |
| | | 2b-2 | | | | | A-7 | 100 | 874018 | 6.2 | 2.70 | 12.8 | 2.17 |
| | | Blank (comparative example 2b) | | | | | — | — | 874118 | 2.3 | — | 5.9 | — |
| | 2c | 2c-1 | Agrochemical 1 | 125000 | D-3 | 9353 | A-1 | 250 | 865397 | 7.5 | 1.67 | 31.7 | 1.50 |
| | | 2c-2 | | | | | A-7 | 100 | 865547 | 7.6 | 1.69 | 35.6 | 1.68 |
| | | Blank (comparative example 2c) | | | | | — | — | 865647 | 4.5 | — | 21.2 | — |
| | 2d | 2d-1 | Agrochemical 1 | 125000 | B3-1 | 15000 | A-1 | 250 | 859750 | 10.8 | 1.93 | 31.3 | 1.21 |
| | | 2d-2 | | | | | A-7 | 100 | 859900 | 7.6 | 1.36 | 36.4 | 1.41 |
| | | Blank (comparative example 2d) | | | | | — | — | 860000 | 5.6 | — | 25.9 | — |
| | 2e | 2e-1 | Agrochemical 1 | 125000 | B3-2 | 15000 | A-1 | 250 | 859750 | 4.9 | 1.63 | 8.7 | 1.67 |
| | | 2e-1 | | | | | A-7 | 100 | 859900 | 7.0 | 2.33 | 9.6 | 1.85 |
| | | Blank (comparative example 2e) | | | | | — | — | 860000 | 3.0 | — | 5.2 | — |

Example 3 and Comparative Example 3

Using the agrochemical compositions shown in Table 4, the coverage rates on the water sensitive paper and the plant leaf were determined.

Table 4 shows that the agrochemical compositions using component (A) have higher coverage rates on the water sensitive paper than the blank not containing component (A), indicating that the evaporation can be inhibited. Further, the compositions with improved coverage rates also had improved coverage rates on the surface of the plant leaf, from which it is understood that the agrochemicals spread wetly after covering, thereby also increasing the spread area on the surface of the leaf. In addition, it is understood that a combined use of component (B) or components (B) and (C) further improves the coverage rates.

TABLE 4

| | | | Agrochemical composition | | | | | | Evaluation | | | |
| | | | Agrochemical | | Component used together | | Evaporation inhibitor [component (A)] | | Water | Water sensitive paper | | Rice plant | |
| | | | Type | Parts by mass | Type | Parts by mass | Type | Parts by mass | Parts by mass | Coverage rate (%) | Ratio to blank | Coverage rate (%) | Ratio to blank |
|---|---|---|---|---|---|---|---|---|---|---|---|---|---|
| Test group | 3a | 3a-1 | Agrochemical 1 | 125000 | — | — | A-1 | 250 | 874750 | 5.1 | 3.40 | 7.4 | 1.76 |
| | | 3a-2 | | | D-2 | 882 | A-1 | 250 | 873868 | 6.2 | 4.13 | 9.8 | 2.33 |
| | | 3a-3 | | | D-4 | 6812 | A-1 | 250 | 867938 | 7.2 | 4.80 | 28.1 | 6.69 |
| | | 3a-4 | | | D-5 | 6812 | A-1 | 250 | 867938 | 6.5 | 4.33 | 21.0 | 5.00 |
| | | 3a-5 | | | — | — | A-7 | 100 | 874900 | 5.3 | 3.53 | 7.8 | 1.86 |
| | | 3a-6 | | | D-2 | 882 | A-7 | 100 | 874018 | 6.2 | 4.13 | 12.8 | 3.05 |
| | | 3a-7 | | | D-4 | 6812 | A-7 | 100 | 868088 | 7.4 | 4.93 | 28.4 | 6.76 |
| | | 3a-8 | | | D-5 | 6812 | A-7 | 100 | 868088 | 6.4 | 4.27 | 21.0 | 5.00 |
| | | Blank (comparative example 3a) | | | — | — | — | — | 875000 | 1.5 | — | 4.2 | — |

Example 4 and Comparative Example 4

Using the agrochemical compositions shown in Table 5, the coverage rates on the water sensitive paper and the plant leaf were determined.

Table 5 shows that the agrochemical compositions using component (A) have higher coverage rates on the water sensitive paper than the blank not containing component (A), indicating that the evaporation can be inhibited. Further, the compositions with improved coverage rates also had improved coverage rates on the surface of the plant leaf, from which it is understood that the agrochemicals spread wetly after covering, thereby also increasing the spread area on the surface of the leaf.

TABLE 5

| | | | Agrochemical composition | | | | | | Evaluation | | | |
| | | | Agrochemical | | Component used together | | Evaporation inhibitor [component (A)] | | Water | Water sensitive paper | | Rice plant | |
| | | | Type | Parts by mass | Type | Parts by mass | Type | Parts by mass | Parts by mass | Coverage rate (%) | Ratio to blank | Coverage rate (%) | Ratio to blank |
|---|---|---|---|---|---|---|---|---|---|---|---|---|---|
| Test group | 4a | 4a-1 | Agrochemical 1 | 125000 | D-4 | 6812 | A-1 | 125 | 868063 | 4.5 | 1.55 | 22.4 | 1.32 |
| | | 4a-2 | | | | | | 250 | 867938 | 7.2 | 2.48 | 28.1 | 1.65 |
| | | 4a-3 | | | | | | 1000 | 867188 | 5.5 | 1.90 | 23.1 | 1.36 |
| | | 4a-4 | | | | | | 2000 | 866188 | 5.2 | 1.79 | 21.8 | 1.28 |
| | | 4a-5 | | | | | | 5000 | 863188 | 5.2 | 1.79 | 23.1 | 1.36 |
| | | 4a-6 | | | | | A-7 | 50 | 868138 | 5.4 | 1.86 | 28.0 | 1.65 |
| | | 4a-7 | | | | | | 100 | 868088 | 7.4 | 2.55 | 28.4 | 1.67 |
| | | 4a-8 | | | | | | 1000 | 867188 | 5.6 | 1.93 | 26.5 | 1.56 |
| | | 4a-9 | | | | | | 2000 | 866188 | 5.2 | 1.79 | 25.6 | 1.51 |
| | | 4a-10 | | | | | | 5000 | 863188 | 4.9 | 1.69 | 22.4 | 1.32 |
| | | Blank (comparative example 4a) | | | | | — | — | 868188 | 2.9 | — | 17.0 | — |

Example 5 and Comparative Example 5

Using the agrochemical compositions shown in Table 6, the coverage rate on the water sensitive paper was determined.

Table 6 shows that the agrochemical compositions using component (A) have higher coverage rates on the water sensitive paper than the blank not containing component (A), indicating that the evaporation can be inhibited.

TABLE 6

| | | | Agrochemical composition | | | | | | | |
| | | | Agrochemical | | Component used together | | Evaporation inhibitor [component (A)] | | Water | Evaluation Water sensitive paper | |
| | | | Type | Parts by mass | Type | Parts by mass | Type | Parts by mass | Parts by mass | Coverage rate (%) | Ratio to blank |
|---|---|---|---|---|---|---|---|---|---|---|---|
| Test group | 5a | 5a-1 | Agrochemical 1 | 125000 | D-1 | 15000 | A-1 | 250 | 859750 | 8.5 | 3.70 |
| | | 5a-2 | | | | | A-2 | 250 | 859750 | 5.3 | 2.30 |
| | | 5a-3 | | | | | A-3 | 250 | 859750 | 5.7 | 2.48 |
| | | 5a-4 | | | | | A-4 | 250 | 859750 | 5.5 | 2.39 |
| | | 5a-5 | | | | | A-5 | 250 | 859750 | 6.0 | 2.61 |
| | | 5a-6 | | | | | A-6 | 250 | 859750 | 5.8 | 2.52 |
| | | 5a-7 | | | | | A-7 | 100 | 859900 | 7.8 | 3.39 |
| | | 5a-8 | | | | | A-8 | 100 | 859900 | 3.4 | 1.48 |
| | | Blank (comparative example 5a) | | | | | — | — | 860000 | 2.3 | — |

Example 6 and Comparative Example 6

Using the agrochemical compositions shown in Table 7, the coverage rate on the water sensitive paper was determined.

Table 7 shows that the agrochemical compositions using agrochemical efficacy enhancing agent compositions containing component (A) have higher coverage rates on the water sensitive paper than their respective blanks using no agrochemical efficacy enhancing agent compositions regardless of agrochemicals used therein, indicating that the evaporation can be inhibited.

TABLE 7

| | | | Agrochemical composition | | | | | | | |
| | | | Agrochemical | | Agrochemical efficacy enhancing agent composition | | Water | Evaluation Water sensitive paper | |
| | | | Type | Parts by mass | Type | Parts by mass | Parts by mass | Coverage rate (%) | Ratio to blank |
|---|---|---|---|---|---|---|---|---|---|
| Test group | 6a | 6a-1 | Agrochemical 1 | 125000 | D-6 | 15250 | 859750 | 8.5 | 5.67 |
| | | 6a-2 | | | D-7 | 15100 | 859900 | 7.8 | 5.20 |
| | | Blank (comparative example 6a) | | | — | — | 875000 | 1.5 | — |
| | 6b | 6b-1 | Agrochemical 2 | 250000 | D-6 | 15250 | 734750 | 5.8 | 3.87 |
| | | 6b-2 | | | D-7 | 15100 | 734900 | 3.5 | 2.33 |
| | | Blank (comparative example 6b) | | | — | — | 750000 | 1.5 | — |
| | 6c | 6c-1 | Agrochemical 3 | 125000 | D-6 | 15250 | 859750 | 12.4 | 3.88 |
| | | 6c-2 | | | D-7 | 15100 | 859900 | 8.2 | 2.56 |
| | | Blank (comparative example 6c) | | | — | — | 875000 | 3.2 | — |

Example 7 and Comparative Example 7

Using the agrochemical compositions shown in Table 8, the coverage rate on the water sensitive paper was determined. The results are shown in Table 8. Note that the agrochemical compositions in Table 8 correspond to a treatment liquid to be applied to a plant.

Table 8 shows that the agrochemical compositions using agrochemical efficacy enhancing agent compositions containing component (A) have higher coverage rates on the water sensitive paper than their respective blanks using the agrochemical efficacy enhancing agent composition not containing component (A) regardless of agrochemicals used therein, indicating that the evaporation can be inhibited.

TABLE 8

| | | | | Agrochemical composition | | | | | | |
|---|---|---|---|---|---|---|---|---|---|---|
| | | | Agrochemical | | Agrochemical efficacy enhancing agent composition | | Water | Evaluation Water sensitive paper | | |
| | | | Type | Parts by mass | Type | Parts by mass | Parts by mass | Coverage rate (%) | Ratio to blank | |
| Test group | 7a | 7a-1 | Agrochemical 1 | 125000 | D-6 | 15250 | 859750 | 8.5 | 3.70 | |
| | | 7a-2 | | | D-7 | 15100 | 859900 | 7.8 | 3.39 | |
| | | Blank (comparative example 7a) | | | D-1 | 15000 | 860000 | 2.3 | — | |
| | 7b | 7b-1 | Agrochemical 2 | 250000 | D-6 | 15250 | 734750 | 5.8 | 2.64 | |
| | | 7b-2 | | | D-7 | 15100 | 734900 | 3.5 | 1.59 | |
| | | Blank (comparative example 7b) | | | D-1 | 15000 | 860000 | 2.2 | — | |
| | 7c | 7c-1 | Agrochemical 3 | 125000 | D-6 | 15250 | 859750 | 12.4 | 2.48 | |
| | | 7c-2 | | | D-7 | 15100 | 859900 | 8.2 | 1.64 | |
| | | Blank (comparative example 7c) | | | D-1 | 15000 | 860000 | 5.0 | — | |

Example 8 and Comparative Example 8

<Coverage Rate Measurement Method 2>

The tank of an agrochemical spraying drone ("AGRAS MG-1" manufactured by Da-Jiang Innovations Science and Technology Co., Ltd. (DJI), the nozzle of the model type TX-VK8 manufactured by Spraying Systems Co. was used) was filled with 1.6 kg of each agrochemical composition. At each of the positions 1 to 12 in the plot of 16 m×8 m shown in FIG. 2 outdoors, an acrylic plate (manufactured by HIKARI CO., LTD., 160 mm×180 mm), on which a sample (a cut-off plant leaf) was stuck with a double-sided tape, was fixed to the ground. In FIG. 2, the plots arranged at 4 m intervals from left were referred to as plots 1 to 4, and the agrochemical composition was sprayed in the following order: from bottom to top in the center of plot 1, from top to bottom in the center of plot 2, from bottom to top in the center of plot 3 and from top to bottom in the center of plot 4. The spraying conditions are a spray altitude of 2 m, a discharge amount of 800 mL/minute, a flying speed of 15 km/hour, and a spray amount of the agrochemical composition equivalent to 0.8 L/10 ares. After the agrochemical composition was sprayed, the surface of the sample was observed using a digital microscope ("VHX-1000," manufactured by KEYENCE CORPORATION) to determine the area of a discolored part, and the average value of those obtained at the twelve positions was used as the coverage rate (%).

Plant leaf: a leaf of a rice plant (Koshihikari rice, tillering stage) (contact angle with water of 141°)

The agrochemical compositions shown in Table 9 were prepared using the above components. Using the obtained agrochemical compositions, the coverage rate on the target object was measured by the above method. Relative values with respect to the blank of the test group are also shown together with the coverage rate. The results are shown in Table 9. Note that the agrochemical compositions in Table 9 correspond to a treatment liquid to be applied to a plant.

Table 9 shows that the agrochemical compositions using agrochemical efficacy enhancing agent compositions containing component (A) have higher coverage rates on the surface of the plant leaf than the blank using no agrochemical efficacy enhancing agent compositions, indicating that the evaporation can be inhibited.

TABLE 9

| | | Agrochemical composition | | | | | | |
|---|---|---|---|---|---|---|---|---|
| | | Agrochemical | | Agrochemical efficacy enhancing agent composition | | Water | Evaluation Rice plant | |
| | | Type | Parts by mass | Type | Pasts by mass | Parts by mass | Coverage rate (%) | Ratio to blank |
| Test group 8a | 7a-1 | Agrochemical 1 | 125000 | D-6 | 15250 | 859750 | 23.0 | 11.50 |
| | 7a-2 | | | D-7 | 15100 | 859900 | 21.5 | 10.75 |
| | Blank (comparative example 8a) | | | — | — | 875000 | 2.0 | — |

The invention claimed is:

1. A method for treating a plant, comprising applying to the plant a treatment liquid that comprises:

a plant treatment agent, and an evaporation inhibitor consisting of (A) at least one compound selected from the group consisting of compounds (AI) to (A6) [hereinafter referred to as component (A)]:

<compound (AI)> a compound obtained by adding at least one alkylene oxide (hereinafter referred to as AO) selected from the group consisting of ethylene oxide (hereinafter referred to as EO) and propylene oxide (hereinafter referred to as PO) at an average number of added moles of 1 or more and 22 or less to a compound of formula (I):

$$R^1OH \qquad (I)$$

wherein in the formula (I), $R^1$ is an alkyl group with 10 or more and 14 or less carbons or an alkenyl group with 10 or more and 14 or less carbons;

<compound (A2)> a compound obtained by adding at least one AO selected from the group consisting of EO and PO at an average number of added moles of 1 or more and 22 or less to a compound of formula (II):

$$R^2—COOH \qquad (II)$$

wherein in the formula (II), $R^2$ is an alkyl group with 11 or more and 19 or less carbons or an alkenyl group with 11 or more and 19 or less carbons;

<compound (A3)> a compound obtained by adding at least one AO selected from the group consisting of EO and PO at an average number of added moles of 1 or more and 22 or less to a monoester of a fatty acid with 10 or more and 20 or less carbons and sorbitan;

<compound (A4)> a polyalkylene glycol with a weight average molecular weight of 100 or more and 3000 or less;

<compound (A5)> a compound represented by formula (III):

$$R^3—COO—R^4 \qquad (III)$$

wherein in the formula (III), $R^3$ is an alkyl group with 15 or more and 19 or less carbons, and $R^4$ is an alkyl group with 1 or more and 18 or less carbons; and <compound (A6)> a compound represented by formula (IV):

$$R^5—COOH \qquad (IV)$$

wherein in the formula (IV), $R^5$ is an alkyl group with 7 or more and 19 or less carbons or an alkenyl group with 7 or more and 19 or less carbons, wherein the treatment liquid is applied to the plant by aerial spraying using a sprayer selected from the group consisting of an industrial unmanned helicopter and an industrial multirotor wherein the treatment liquid further comprises (B) an agrochemical efficacy enhancing agent comprising:

(B1) represented by the following formulas (V) and (VI):

$$R^6O(R^8O)_nSO_3^-M^+ \qquad (V)$$

$$R^7SO_3^-M^+ \qquad (VI)$$

wherein in the formulas (V) and (VI)

$R^6$ and $R^7$ are each independently a hydrocarbon group;

$R^8$ is an alkylene group with 2 or more, and 4 or less carbons;

n is an average number of added moles; and $M^+$ is a counterion, and (B2) a (poly) glycerin fatty acid ester.

2. The method for treating a plant according to claim 1, wherein the plant treatment agent is a component selected from the group consisting of an agrochemical, a fertilizer and an antiseptic.

3. The method for treating a plant according to claim 2, wherein the agrochemical is at least one selected from the group consisting of a bactericide, an insecticide, a miticide, a herbicide and a plant growth regulator.

4. The method for treating a plant according to claim 1, wherein the treatment liquid comprises 30 mg/kg or more and 6000 mg/kg or less of the evaporation inhibitor.

5. The method for treating a plant according to claim 1, wherein the treatment liquid is sprayed at a rate of 0.1 L or more and 500 L or less per 10 ares.

6. The method for treating a plant according to claim 1, wherein the treatment liquid is brought into contact with a part of the plant at which a contact angle with water is 50° or more and 180° or less.

7. The method for treating a plant according to claim 1, wherein the plant is a crop, and the treatment liquid is applied to the crop before harvesting.

\* \* \* \* \*